United States Patent
Courson

(10) Patent No.: US 9,453,411 B2
(45) Date of Patent: Sep. 27, 2016

(54) ROTARY CAM RADIAL STEAM ENGINE

(71) Applicant: Michael W. Courson, Alpine, CA (US)

(72) Inventor: Michael W. Courson, Alpine, CA (US)

( * ) Notice: Subject to any disclaimer, the term of this patent is extended or adjusted under 35 U.S.C. 154(b) by 371 days.

(21) Appl. No.: 13/871,963

(22) Filed: Apr. 26, 2013

(65) Prior Publication Data
US 2013/0233259 A1 Sep. 12, 2013

Related U.S. Application Data

(63) Continuation-in-part of application No. 12/888,985, filed on Sep. 23, 2010, now abandoned.

(51) Int. Cl.
| | |
|---|---|
| *F01B 1/06* | (2006.01) |
| *F02B 75/22* | (2006.01) |
| *F16J 9/08* | (2006.01) |
| *F01B 13/06* | (2006.01) |
| *F03C 1/04* | (2006.01) |
| *F03C 1/24* | (2006.01) |
| *F03C 1/247* | (2006.01) |
| *F01L 7/02* | (2006.01) |
| *F01L 33/02* | (2006.01) |

(52) U.S. Cl.
CPC .............. *F01B 1/0603* (2013.01); *F01B 1/06* (2013.01); *F01B 1/0668* (2013.01); *F01B 13/06* (2013.01); *F01B 13/061* (2013.01); *F01L 7/021* (2013.01); *F01L 33/02* (2013.01); *F02B 75/222* (2013.01); *F03C 1/04* (2013.01); *F03C 1/0428* (2013.01); *F03C 1/2407* (2013.01); *F03C 1/247* (2013.01); *F16J 9/08* (2013.01)

(58) Field of Classification Search
CPC ........ F16J 15/164; F16J 9/08; F03C 1/0428; F03C 1/04–1/0444; F03C 1/2407–1/2446; F03C 1/247; F01B 1/0668; F01B 1/06–1/0617; F01B 13/06–13/066
USPC ......... 60/634, 637, 645, 618, 651; 123/25 P, 123/204, 227, 226; 418/215, 264, 266, 150, 418/201.1; 92/148, 72; 91/491–494
See application file for complete search history.

(56) References Cited

U.S. PATENT DOCUMENTS

| | | | | |
|---|---|---|---|---|
| 1,603,969 | A * | 10/1926 | Michel | 123/51 B |
| 2,719,767 | A * | 10/1955 | Ernest | 277/447 |
| 3,587,401 | A * | 6/1971 | Johansson | F03C 1/0428 91/180 |
| 3,612,545 | A * | 10/1971 | Storms | 277/582 |
| 3,844,198 | A * | 10/1974 | Foster et al. | 91/472 |
| 3,875,851 | A * | 4/1975 | Foster | F03C 1/2407 91/498 |
| 3,922,956 | A * | 12/1975 | Foster | 91/491 |
| 3,964,450 | A * | 6/1976 | Lockshaw | 123/54.3 |
| 3,978,771 | A * | 9/1976 | Burnight et al. | 91/491 |
| 4,136,602 | A * | 1/1979 | Lenz | F01B 13/061 91/491 |
| 5,347,915 | A * | 9/1994 | Feistel | F16J 9/28 277/451 |

(Continued)

*Primary Examiner* — Thomas Denion
*Assistant Examiner* — Xiaoting Hu
(74) *Attorney, Agent, or Firm* — Wiley Rein LLP

(57) ABSTRACT

A rotary cam radial engine formed of two primary components is provided which is engaged at a mid section to allow for an easy repair. The device features a body having radially oriented locating cavities engaged with cylinders and a plurality of pistons in a respective reciprocating engagement, within each respective cylinder. The pistons are driven by low pressure fluids and/or a vacuum and the engine being formed of two main components can be taken apart without tools for maintenance and reconfiguration.

19 Claims, 17 Drawing Sheets

(56) References Cited

U.S. PATENT DOCUMENTS

| | | | |
|---|---|---|---|
| 5,657,681 A * | 8/1997 | Henricson | 91/472 |
| 5,944,493 A * | 8/1999 | Albertin | F04B 1/0404 |
| | | | 417/273 |
| 6,681,738 B2 * | 1/2004 | Endoh et al. | 123/227 |
| 6,846,163 B2 * | 1/2005 | Takahashi et al. | 417/204 |
| 7,083,402 B2 * | 8/2006 | Ichikawa et al. | 418/145 |
| 2005/0087066 A1 * | 4/2005 | Kimura et al. | 91/491 |
| 2010/0024764 A1 * | 2/2010 | Reinhardt | F01B 1/0606 |
| | | | 123/204 |
| 2011/0114038 A1 * | 5/2011 | Lemke et al. | 123/41.35 |
| 2012/0211942 A1 * | 8/2012 | Smith et al. | 277/300 |

* cited by examiner

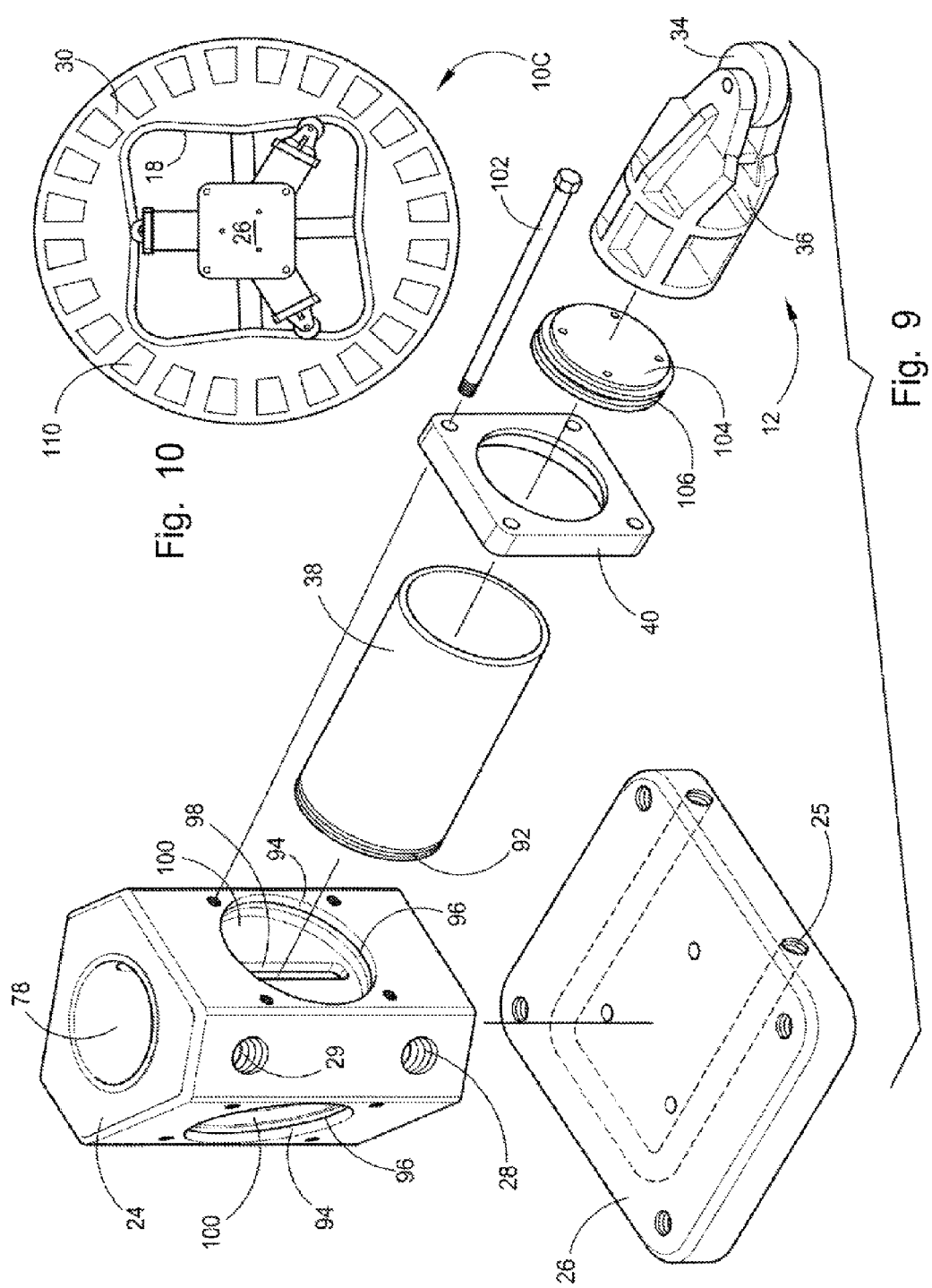

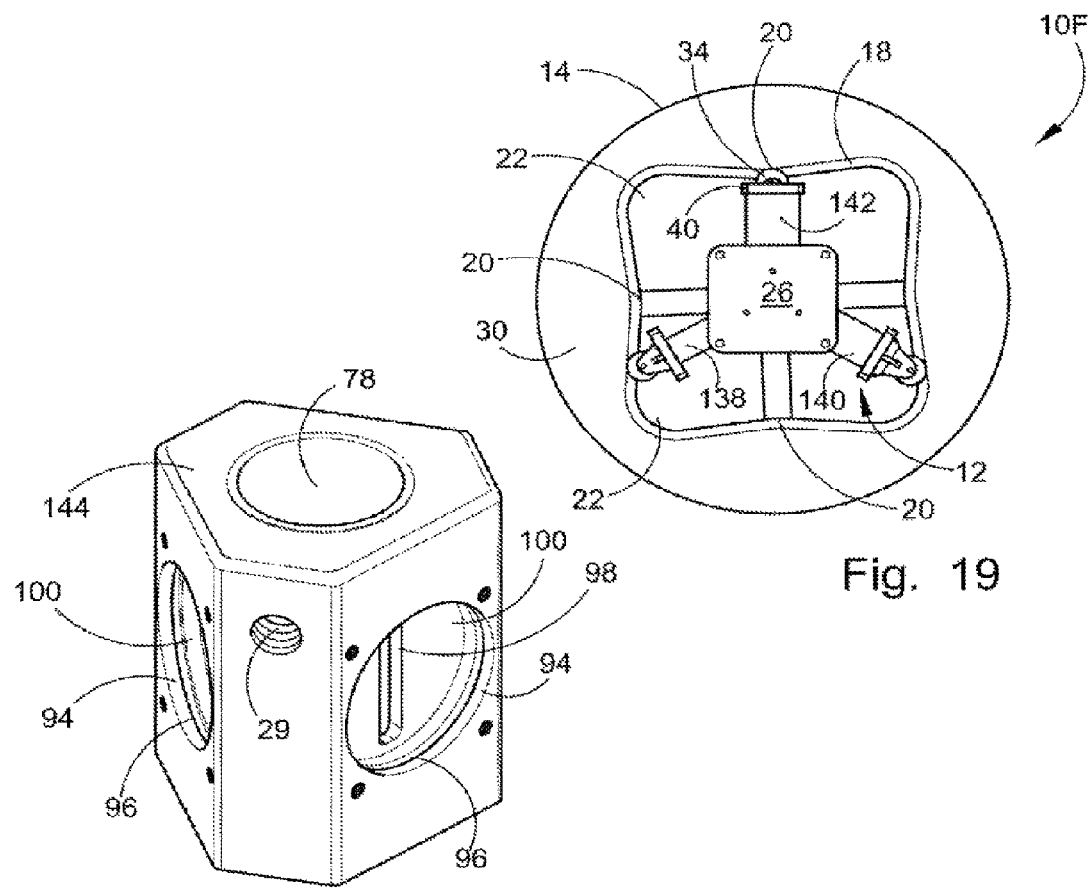
Fig. 19
Fig. 20
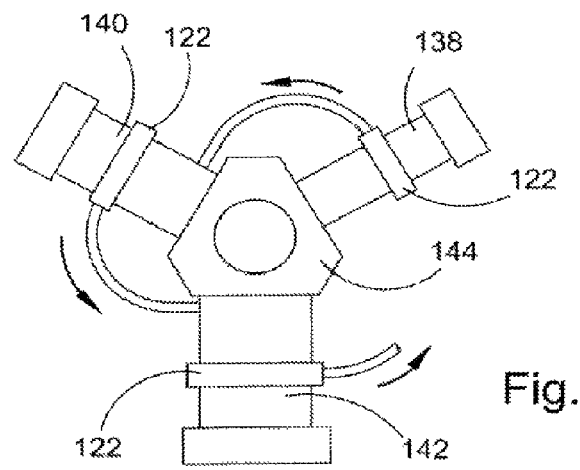
Fig. 21

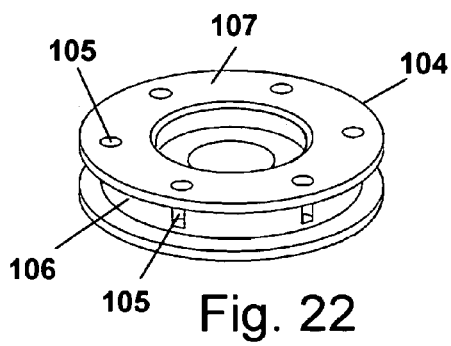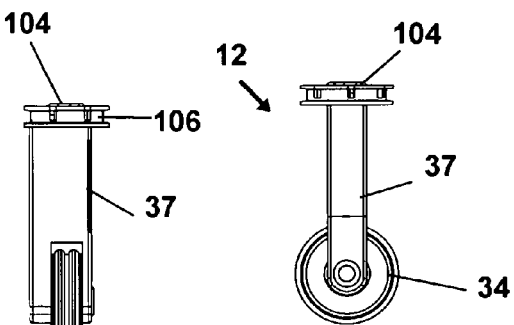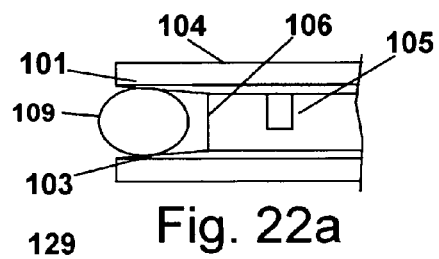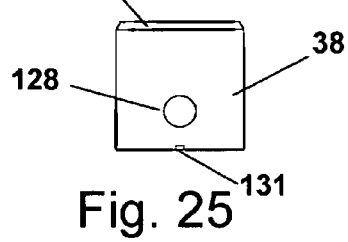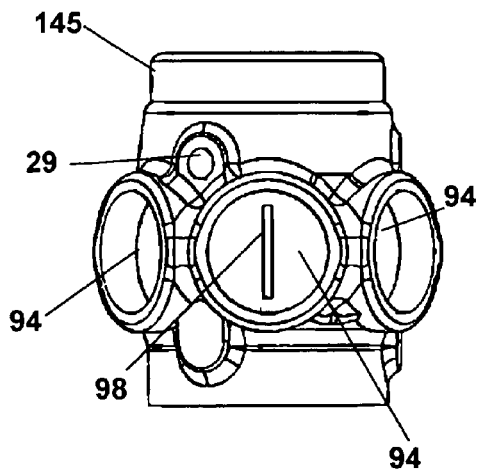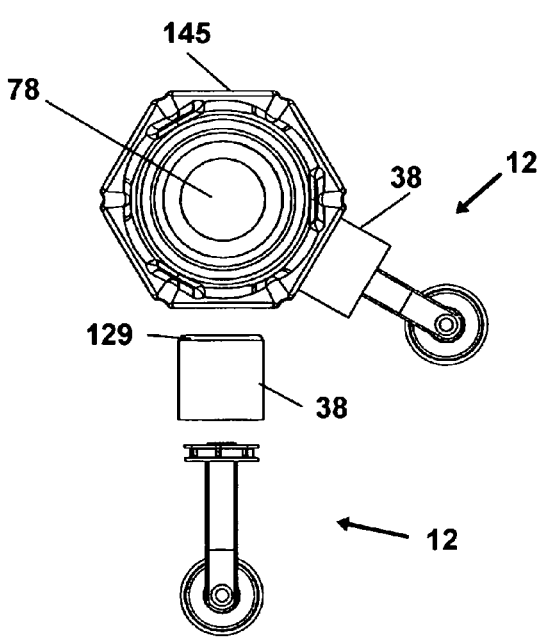

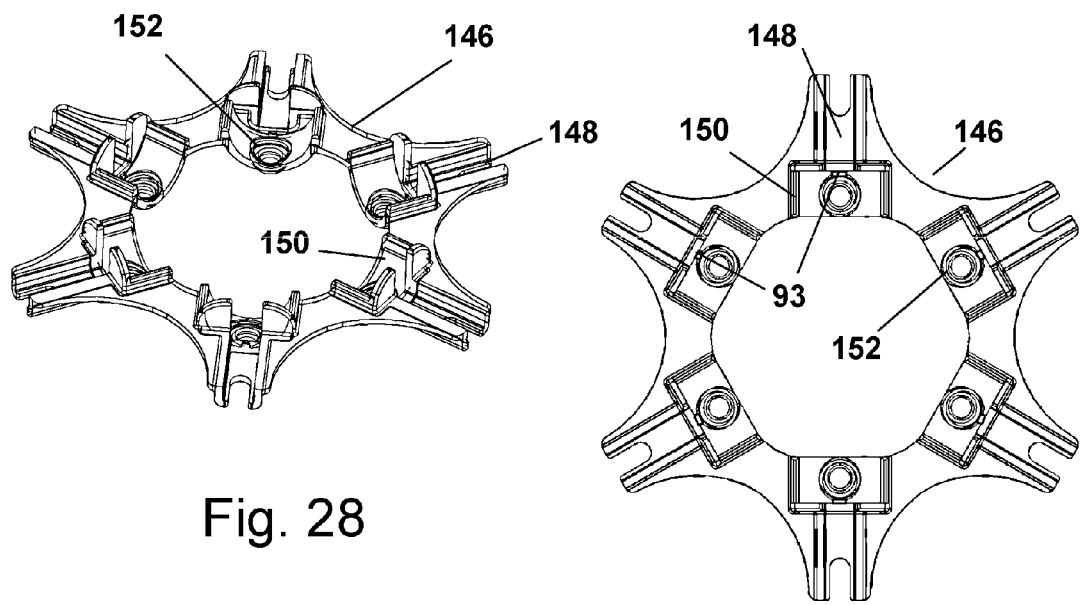
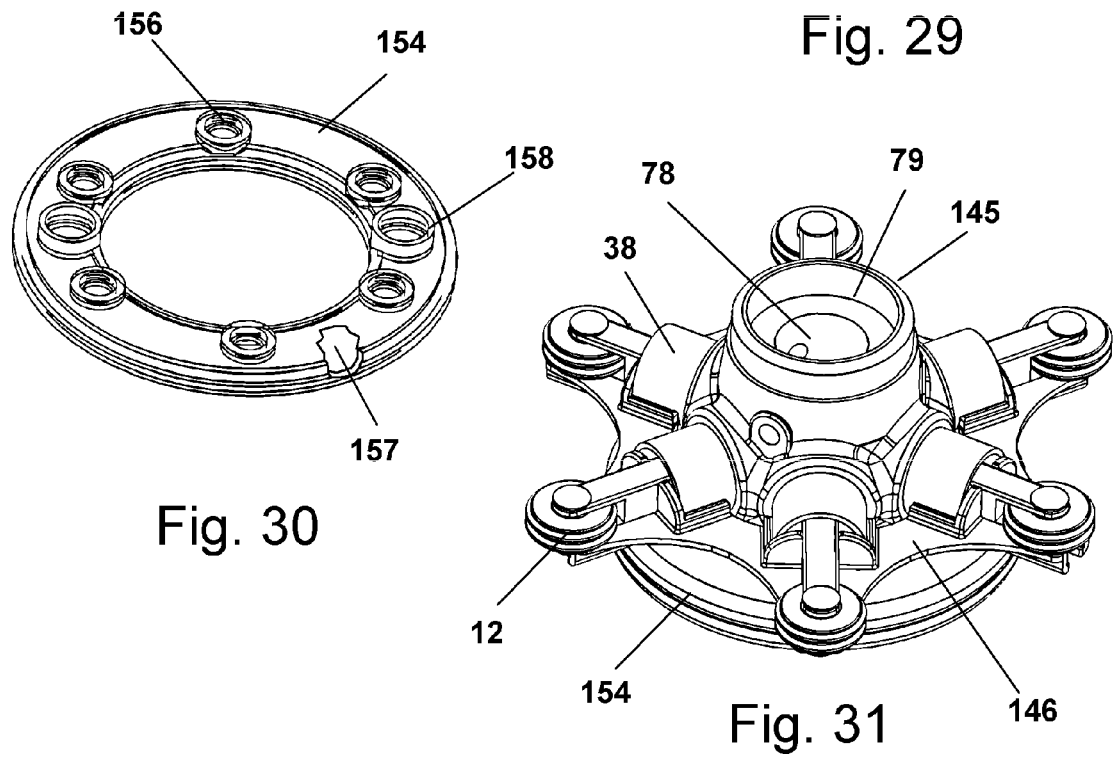

ROTARY CAM RADIAL STEAM ENGINE

This application is a Continuation in Part application to U.S. patent application Ser. No. 12/888,985 with a filing date of Sep. 23, 2010, which is included herein in its entirety by this reference thereto.

BACKGROUND OF THE INVENTION

1. Field of the Invention

The present invention provides a lightweight multiple piston rotary cam radial engine formed of two primary components operatively engaged. More particularly, it relates an engine having its interior moving parts operatively engaged within a body portion which when mated with a retaining ring which maintains cylinders in place and provide a plurality of pathways for translation of the rods in a rotary configuration with distal ends of reciprocating rods operatively radially engaged to rotate a surrounding rotating cam. The device is rendered easy to assemble and disassembly by the separation of the body and retaining ring components to allow for replacement of cylinders and pistons. The retaining component also doubles as a guide for re assembling the pistons and rods in their defined positions.

The engine is capable of communicating rotational power for work to the rotating radial cam, through the generation of power from a variety of different power sources which when communicated to a cylinder will translate the pistons and engaged rods. Such externally produced power for example can be steam from wood or fuel powered heat, compressed gas, and pumped or gravitationally powered streams such as water elevated and communicated to the device. The resulting simplicity in both construction and disassembly and repair, and the multiple means for powering the device, makes it especially novel and useful in rural areas of first work countries, and all areas of third world countries in general.

Powering fluid streams communicated to the cylinders can also be powered by a secondary power production device such as a windmill or water wheel to communicate a pressurized or moving fluid stream to the device located locally, such as in a village, from a water wheel or windmill or boiling water station located in a more remote or inhospitable location. Power to perform work such as pumping well water or generating electricity is provided locally as is maintenance.

Not only is the assembly and disassembly of the device rendered easy by the simple engagement of the body having cylinders therein and retaining ring having pathways for cylinders and rods, the no-fastener design and configuration, simplifies engine assembly and disassembly to novel new levels in it is configured to form the pathways for the assembly of pistons and rods which are easily discerned by users with minimal or no mechanical training. Further, the actual assembly of the various internal components with little to no use of conventional fasteners for engagement, and the two component mating of body and radial cam, with minimal fasteners, thus allows a user with limited knowledge to easily disassemble the device for maintenance or servicing of the various components.

The disclosed engine herein can thus provide simple to operate and maintain, low cost rotational power, for turning a rotary pump, or an electric generator operationally engaged or formed in a combination with a rotor assembly comprising a plurality of magnets and a stator assembly comprising a plurality of coil windings which are operationally engageable in the engine assembly.

In at least one preferred mode configured for producing electricity, the introduction of a powering fluid flow is provided by a remote windmill powering a mechanical pump which communicates pressurized air, or more dense fluid, through conduits directly to the device, or to elevated storage tanks to store the power for later use. When communicated through the valve system to the cylinders, the fluid or steam imparts force to power piston reciprocation and rod translation, within the rotary configured engine. The rotating cam, powered by the rotationally engaged rods, may be engaged to a generator, or the device may be formed in combination with a rotor and stator as an electrical alternator. In another mode, the engine, upon receiving power from force of fluid or pressurized gas which expands in the cylinders to reciprocate the pistons, can provide a communication of rotational mechanical drive through the operative engagement of a wheel or shaft to the rotating cam.

In all modes a simple body and retaining ring assembly provides the formed pathways for pistons and rods and other moving components, as well as a visual guide for component placement and assembly, with minimal fasteners to get lost or break in environments where repairs would be a problem.

2. Prior Art

A steam engine is a mechanical device used to transfer the energy of steam into mechanical energy for a variety of applications, including propulsion and generating electricity. The basic principle of the steam engine involves transforming the heat energy of steam into mechanical energy by permitting the steam to expand and cool in a cylinder equipped with a movable piston. Steam that is to be used for power or heating purposes is usually generated in a boiler. The simplest form of a boiler is a closed vessel containing water, which is heated by a flame so that the water coverts to saturated steam.

Steam engines, heat engines using boiling water to produce mechanical motion, have a long history, going back at least 2000 years. Early devices were not practical power producers, but more advanced designs producing usable power have become a major source of mechanical power over the last 300 years, enabling the industrial revolution, beginning with applications for mine water removal, using vacuum engines.

Subsequent developments using pressurized steam and conversion to rotary motion enabled the powering of a wide range of manufacturing machinery anywhere water and coal or wood fuel could be obtained, previously restricted only to locations where water wheels or windmills could be used. Significantly, this power source would later be applied to prime movers, mobile devices such as steam tractors and railway locomotives. Modern steam turbines generate about 80 percent of the electric power in the world using a variety of heat sources.

Steam powered engines were the first engine type using pressurized fluid to drive pistons to generate power, to see widespread use. They were first invented by Thomas Newcomen in 1705, and James Watt who made big improvements to steam engines in 1769. The steam engine developed by James Watt is generally credited as being the first efficient steam engine. A steam engine is a heat engine that performs mechanical work using steam as its working fluid to impart pressure to a cylinder to reciprocate a piston to turn a shaft which delivers power to be employed for work. Steam engines are typically external combustion engines, that is to say the heat generating the pressurized gas for power, is generated externally, although other external sources of heat to produce expanding pressurized fluid such as solar power, nuclear power or geothermal energy may be used. The heat cycle is known as the Rankine cycle.

There have been many newer and more recent innovations to the steam engines and they have generally continued using high-pressure steam as a driving force requiring extremely heavily constructed equipment. These types of steam engine normally work with a piston that drives a central output shaft.

Pneumatic motors operate on a similar application of compressed air instead of steam. These motors are generally smaller and lighter weight and operate at high revolutions.

With the need for efficient energy generation, there is a growing requirement for lighter weight, economical motors to be used on different applications, capable of using a variety of different power generating sources including, but not limited to steam. These power sources could also include compressed air, compressed gases, combustion of gasses, and pressurized fluids.

Numerous innovations for steam engines and air-operated motors have been provided in the prior art that are described as follows. Even though these innovations may be suitable for the specific individual purposes to which they address, they differ from the present design as hereinafter contrasted.

It is especially noted that many advancements of prior art technologies, seem to have driven innovations that are highly specific and extremely narrow in application, while often employing expensive and impossible to service components, resulting in the average consumer being unable to put these device to use.

Historically and even currently, the most reliable and most powerful engines throughout the world have been and are steam engines. Our largest commercial and military ships contain final drives which employ steam engines. The early steam driven vehicles were simple and powerful for their engine sizes and were preferable to having to feed and care for a horse.

The petroleum age provided the even more convenient gasoline engine which resulted in the halting the further advance of steam engine design. Now, in clear and simple retrospect, more than any industry, the petroleum industry as an energy source, has resulted in large scale health, weather and environmental damage into the ecology world wide. Oil resources and availability are becoming more limited and its costs have begun rising rapidly. Oil and electricity have become the primary resources providing the energy that the world has become dependent on. The petroleum industry besides its world destructive influence has grown huge and complex right down to its distribution systems which are absent in remote area and crippled in a disaster situation. Electricity still appears to be a reasonably clean source of energy but is no different in its need of a common complex system to distribute it. In a large disaster situation, its distribution system is crippled. Even in heavily populated areas, black outs and brown outs from our central utility companies are becoming more common. Even the temporary loss of electric power often result in deaths, losses of important services, loss of food storage refrigeration, heating or cooling in extreme weather conditions, the ability for service stations to provide fuel used for transportation, police and fire departments lacking power beyond what their temporary supply of fuel will provide, individual medical devices are unusable, hospitals have only a limited supply of emergency power without additional fuel supplies, a long list exists. When a natural disaster occurs such has become common in recent years, entire populations are left for significant lengths of time with no power.

The following is a summary of those prior art patents most relevant to this application at hand, as well a description outlining the difference between the features of the Rotary Cam Radial Steam Engine and the prior art.

U.S. Pat. No. 3,967,535 of Murry I. Rozanski describes a uniflow steam engine of the multi-cylinder type wherein the cylinders are rotatably mounted within a jacket having a sinusoidal cam track therein. Extending through slots, the ends of which are the exhaust ports in the cylinders and into the cam track are cam followers, which are mounted on the pistons for reciprocal movement therewith. At the head end of the cylinders, there are apertures which rotate with registered cutouts in superimposed valve rings that control the flow of steam from manifolds at the head ends of each of the cylinders into the cylinders as the cylinders rotate. By adjusting the relative position between the valve rings, the length of time of steam introduced on each cycle may be adjusted and by concomitantly rotating both valve rings, the initial time for introduction of steam may be adjusted to alter lead or reverse torque.

Rozanski describes a multi-cylinder unconventional uniflow type of steam engine in a compact design. By using a multi-cylinder type, wherein the cylinders are rotatably mounted within a jacket having a sinusoidal cam track, it differs in that the Rotary Cam Radial Steam Engine uses one or more pistons with a revolving rotating outer cam ring. It also differs from the multi-cylinder unconventional uniflow type in that the Rotary Cam Radial Steam Engine can be very light weight and can be made primarily of plastic.

U.S. Pat. No. 4,132,213 of R. Homer Weaver describes a rotary engine having a power output shaft, a drive unit for rotating the shaft, the drive unit including a rotary drive element affixed to the shaft, and a stationary element for supporting the shaft rotatably. A pair of diametrically spaced, rotatable, paddle-like pistons are mounted on the rotary drive element. The paddle-like pistons rotate into and out of opposing, complementary cavities formed in the rotary drive element and in the stationary element. The complemented cavities function as revolving cylinders or chambers for the reception of a high pressure, expansible fluid. The expansible fluid drives the pistons to impart rotation to the rotary element, to drive the power output shaft. A source of high pressure expansible fluid is provided, together with a valve system connecting the fluid source to the drive unit. The valve system is automatically operative to discharge the fluid under high pressure into the drive unit chambers at periodic intervals. The source of high-pressure fluid may comprise a compressor having a construction similar to that of the drive unit, for receiving and compressing a fuel and air mixture. The engine is adaptable to be utilized as a gasoline internal combustion engine, a diesel engine, a steam engine, or any other type of engine using high pressure, expansible fluids.

Weaver describes a rotary engine having a power output shaft. It differs in that it uses rotatable paddle like pistons mounted on a rotary drive element using high pressure instead of a conventional piston. This device would require it to be made of a heavy material that would be capable of taking the high pressure and could not be made of plastic or materials not capable of sustaining high stress levels.

U.S. Pat. No. 5,364,249 of Donald M. Link tells of a rotary steam engine that has a working chamber, with first and second cylindrical rotors mounted in overlapping cylindrical chamber portions for rotation about respective parallel axes, connected by gears for synchronized rotation. The first rotor has at least one pusher extending radially outward of the first rotor's circumferential surface, and the second rotor's, circumferential surface has a corresponding at least one indenture shaped to receive the pusher during rotation of the two rotors. Side plates attached to the first rotor for rotation with the first rotor, press against spring-loaded seals and the second rotor to provide improved sealing with minimum wear.

The device of Link, however, teaches a rotary steam powered engine that does not use pistons or a cam action as does the Rotary Cam Radial Steam Engine. It is another steam engine that could not be made of plastic or low stress materials because of the internal forces that it develops.

U.S. Pat. No. 6,128,903 of Carl Ralph Riege describes a device that is a simplified solar steam engine. It consists of a sole reciprocating piston within a slotted cylinder. A piston-actuating arm extends through the slot to provide the power take off. The actuator arm also provides the power to a slide valve within an input/output (I/O) manifold that directs the steam correspondingly to each end of the steam engine to move the piston back and forth. The actuator arm provides the power directly to a load such as a pump piston which in turn also requires the back and forth movement to provide air pressure for air tools. Water jet propulsion power could be provided for small boats like kayaks or canoes and the like. Even compression for home air conditioners may be possible.

Riege describes a simplified solar steam engine that consists of a sole reciprocating piston within a slotted cylinder. It does not make use of multiple cylinders or a rotating outer cam ring. On this device, the manifold directs the steam correspondingly to each end of the steam engine to move the piston back and forth.

U.S. Pat. No. 6,862,973 of Jeffery Rehkemper et al. describes one embodiment a pneumatic motor that is provided including an intake chamber in fluid communication with at least one intake channel Each intake channel is further in fluid communication with a corresponding cylinder, which receives a piston that cycles upwardly and downwardly to rotate a motor axle. A member is placed in each intake channel to seal the corresponding cylinder from each intake channel when the compressed fluid in the intake channel has a higher pressure than pressure in the corresponding cylinder. Each piston includes an actuator extending downwardly from the piston and having a profile that, during a portion of the upward cycle of the piston, causes the actuator to push the member back into each intake channel to allow compressed fluid into each of the corresponding cylinders. Each piston includes an intermediate section that has an annular recess, a seal positioned in the recess that creates a fluid tight seal against the corresponding cylinder during the upward cycle of the piston. Compressed fluid that enters the corresponding cylinder during the upward cycle will push the piston upwardly. Each section further includes exhaust grooves defined thereon such during the downward cycle of the piston the, seal is broken allowing compressed fluid in the cylinder to bypass the piston and escape through a vent above each cylinder. This causes the compressed fluid in the intake channel to push the member to re-seal the cylinder. The upward movement of the piston further generates inertia that moves the piston downward to continue the cycle Rehkemper et al. describes a pneumatic motor that could be steam driven, but it does not operate by the means of multiple cylinders driven by a single central rotating valve or function by the means of a rotating outer cam ring.

U.S. Pat. No. 7,536,943 of Edward Pritchard discloses a steam engine with improved intake and exhaust flow provided by separate pairs of intake and exhaust ports located at both ends of a steam drive cylinder. A slide valve located adjacent to the drive cylinder provides for timed sealing of intake and exhaust ports during operation. Exhaust is facilitated by the provision of two paths of exhaust from the cylinder and the exhaust ports may be adjusted for a flow volume to meter exhaust steam flow to significantly reduce back pressure only at low speeds of said engine.

Pritchard discloses a steam engine with improved intake and exhaust flow provided by separate pairs of intake and exhaust ports using a piston that is driven from the top and bottom by the means of a valve that moves up and down. It does not make use of multiple cylinders or a rotating outer cam ring.

None of these previous efforts, however, provides the benefits attendant with the herein disclosed Rotary Cam Radial Steam Engine. The present design achieves its intended purposes, objects and advantages over the prior art devices through a new, useful and unobvious combination of method steps and component elements, with the use of a minimum number of functioning parts, at a reasonable cost to manufacture, and by employing readily available materials.

In this respect, before explaining at least one embodiment of the Rotary Cam Radial Steam Engine in detail, it is to be understood that the design is not limited in its application to the details of construction and to the arrangement, of the components set forth in the following description or illustrated in the drawings. The Rotary Cam Radial Steam Engine is capable of other embodiments and of being practiced and carried out in various ways.

In addition, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present design. It is important, therefore, that the claims be regarded as including such equivalent construction insofar as they do not depart from the spirit and scope of the present application.

SUMMARY OF THE INVENTION

The principal advantage of the Rotary Cam Radial Steam Engine having a radial cam operationally engaged to rotate from power generated by pistons and rods translating radially within a paired component housing, is to provide an economical and lightweight engine which can be used in a variety of different applications using energy generated in a variety of different manners such as from windmills, to open fires, to pumps driven by water wheels.

Another advantage of the Rotary Cam Radial Steam Engine is that it requires low steam, air, or other fluid pressure to operate while it still provides high horsepower at low revolutions per minute (RPM) with low stresses applied to its components. As can be discerned by one skilled in the art, the device can also be configured to function as an internal combustion engine by providing an ignition means such as a spark plug or high compression and a fuel and air mix intake which could be provided easily enough by a mix of oxygen and gas in the conduits employed herein for communication of the pressurized fluid supply.

Another advantage of the Rotary Cam Radial Steam Engine is through the use of material stress reduction resulting from multiple power strokes provided from each piston per single revolution of the engine results in a steam engine that can be manufactured from a variety of different inexpensive materials including plastic thus decreasing manufacturing costs.

Another advantage is having a low RPM engine that does not require reduction gears; pulley belts or chain drives lessening the amount of friction introduced into an engine and lengthen the life of the engine.

Another advantage is a powerful, low RPM engine that does not require reduction gears; pulley belts or chain drives eliminating the costs and maintenance of the normally necessary drive systems.

Another advantage of the Rotary Cam Radial Steam Engine is to provide an alternative energy mechanism, which will operate on low-pressure steam and will allow the source to be from simple solar collector or any low pressure boiler providing the steam generated by any combustible heat source including wood, paper, dung, any fossil fuel, or clothing.

Another advantage of the Rotary Cam Radial Steam Engine is that the entire central structure including stationary engine body, cylinders and valves can be simply and fully enclosed by insulation to minimize heat loss, maximize thermal efficiency and quieting the engine or source of pressure differential.

Another advantage is that the working parts of the preferred embodiment of the Rotary Cam Radial Steam Engine can be quickly and simply disassembled with no need of any tools for maintenance, rebuilding, or access to all moving parts of the engine.

Another advantage is that all parts required for normal maintenance or replacement of all seals and piston rings can be purchased as inexpensive, common, off the shelf parts.

Another advantage of the Rotary Cam Radial Steam Engine is that the steam consumption (fuel consumption) of the engine can be changed significantly, and inexpensively by more than or less than half with no change or modification of the stationary engine body or pistons and cylinders by a quick and simple change to a different external cam ring and central rotating valve assembly containing a higher or lower number of lobes and number of ports in the rotating valve assembly.

Another advantage of the Rotary Cam Radial Steam Engine is that the power of the engine can be changed significantly, by more than or less than half with no change or modification of the stationary engine body or pistons and cylinders by a quick and simple changing the external cam ring, and central rotating valve assembly.

Another advantage of the Rotary Cam Radial Steam Engine is that the number of power strokes per piston per rotation of the engine can be changed with no change or modification of the stationary engine body or pistons and cylinders. Such may be accomplished by a quick and simple changing of the external cam ring or individual lobe portions of the cam ring, and/or the central rotating valve assembly.

Another advantage of the Rotary Cam Radial Steam Engine is that it can be powered by a variety of different fluid power sources, such as steam, compressed air, other gasses, a liquid under pressure, or a vacuum source of negative fluid pressure.

Yet another advantage of the Rotary Cam Radial Steam Engine is that the outer diameter of the unit rotates while the central structure remains stationary.

Another advantage is that the Rotary Cam Radial Steam Engine provides a large rotating surface that can be constructed with molded cavities or cut to accept magnets as a portion of an electrical generator armature or magneto of a stator/rotor type electric generator configuration. The rotating surface employing magnets can be coupled with a stationary stator having coil windings which generate electricity through electromagnetic induction of the magnets rotating past the stationary coils and the alternator design allows for a quick—"while in the field" exchange of the stator and coils to provide virtually an infinite choice of voltage produced by the device.

Another advantage is that the Rotary Cam Radial Steam Engine provides a large rotating surface that can be molded with fins to provide air flow for cooling applications.

Another advantage is the outer rotating surface of the engine can be inexpensively molded of plastic for many usable purposes.

Another advantage is the central rotating valve assembly is central and common to the entire engine eliminating the need for separate valves for each cylinder.

And still another advantage is the steam forces maintain a constant higher pressure during compression and lower pressure on return during exhaust stroke, resulting in elimination of the need of mechanical retention to maintain contact between the piston cam roller and the outer driving cam ring.

A further advantage is the central rotating valve can also act as a steam chest to insure that a steam reservoir is available for immediate and complete fill of steam to each cylinder so that they are not hindered by orifice or pressure line sizes. Another advantage is that the central rotating valve can have both intake and exhaust valve openings built into the same central rotating valve body. This provides efficiency, less motor internal parts, simplified mechanical design, and notably lower costs to manufacture the engine.

A further advantage is that the configuration of the engine/valve and cylinder heads located radially are close to the central rotating valve. This provides the benefit of minimum loss of temperature or steam pressure between valve and cylinder as well as precision valving for the entire radial engine from one simple valve instead of one for each cylinder.

And still another advantage is that each piston can provide more than one power stroke per rotation. A three cylinder engine of this design could have as few as three power strokes per rotation, or any plurality depending upon the number of lobes on the rotating outer cam ring.

Another advantage is that the engine reduces power loss through the employment piston seals disposed between the pistons and cylinder walls. The sealing means can comprise one or a combination of a conventional O-ring, or a plurality of wraps of material, such as TEFLON rope.

Still another advantage is that the engine design may employ means for communicating at least some of the pressurized working fluid to the piston seals to provide a continuous positive seal pressure against the cylinder wall which is self-renewing.

Still another advantage is that the piston seals can be replaced by materials other conventional materials as a temporary replacement, such as organic matter.

Another advantage is that as a result of its use of low pressure energy and its novel piston sealing ring design, if necessary, the sealing materials of the piston to cylinder surfaces can be effectively replaced for short periods of time with a material as simple and common as wraps of shoe string or cotton chord until more long term ideal materials such as flexible TEFLON or TEFLON/graphite composite chord.

Another large advantage of this design is that the radius of the "lobes" on the outer rotating cam will provide a magnified amount of leveraged power relative to the lineal stroke of the piston that would normally be provided in an engine running with a centrally located crankshaft. Thus the level of torque per lineal stroke of the piston can be adjusted.

Another advantage of the invention is that the cam ring may employ removably engageable and individual lobe portions which are replaceable and interchangeable. Thus the user can adjust the piston stroke length and torque per piston by employing the lobe portion having the desired geometry, without the need for replacement of the entire cam ring.

Another advantage is the stress on each piston and cylinder to provide the rated horsepower is decreased proportionately by the number of lobes on the outer rotating cam ring. This allows engine parts to be produced from less expensive and easier formed materials Another advantage is that the design of the engine allows the "stacking" of cases and piston arrangements to increase capability. The stacking ability and use of substantially no fasteners in the engine design allows a user with limited knowledge to easily disassemble the device for maintenance or servicing of the various components.

Another advantage is that an alternate embodiment of the Rotary Cam Radial Steam Engine, using the term uniflow exhaust design, would have progressively larger pistons and cylinders where the exhaust pressure from the smaller piston and cylinders is directed to the next larger cylinder where in turn that exhaust pressure is directed to the next larger cylinder greatly increasing the efficiency of the engine through reuse of what would normally be waste energy or exhausted steam.

Another advantage of the engine design is that in at least one preferred mode the piston rods are linearly retained within a formed slot or retainer means to reduce non-linear torque forces being communicated to the pistons for substantially maintaining linear motion at the pistons relative the cylinders. Thus frictional wear and stresses conventionally resulting from non-linear movement of the pistons within the cylinders, is substantially eliminated.

Another principal advantage of the Radial Cam Rotary Steam Engine is that it can be easily re-configured with the quick rotation of an adjustment in the valve/cam assembly to provide an equally effective service as a pump to create compressed air, or to be used as an effective vacuum pump.

A further advantage and innovation of the stacking engagement of the components of the Radial Cam Rotary Steam Engine allowing a user to quickly and easily change a valve/cam assembly to one of different number of valve openings and cam lobes—the number of power strokes or vacuum cycles per single rotation of its valve cam assembly—can be multiply changed. This change in power, economy and efficiency is equally magnified whether the engine is being used as an electric generator, a vacuum pump, or an air compressor. An example would be as follows: If the base engine component is a 6 cylinder unit—and the valve/cam assembly is changed from a 3 lobed cam, to a 5 lobed cam, the number of power strokes or compression or vacuum strokes per single revolution of the system changes from 18 strokes per single revolution to 30 strokes per single revolution. This provides a wide range of power and flexibility conservatively provided from the same body/cylinder/piston assembly and involves significantly decreased cost.

A further advantage of the Radial Cam Rotary Steam Engine is that through the use of its multiple radial cylinders combined with its independent assembly, multiple-lobed cam, the stresses experienced by each component of the design are significantly diminished. The result of this is at least two fold. The normal wear experienced by each component is greatly reduced resulting in excellent longevity and dependability of the system. The second notable result of this reduced material stresses is that it opens up a wide choice of lower cost materials that can be used in its manufacture, making it more affordable and available to a wider section of population.

Another advantage of the two component radial cam rotary mechanism is its ability to provide power as a low pressure, low temperature waste heat engine driven by use of solar created steam, geothermal heat, waste heat normally exhausted from other power sources, compressed air supplied through the use of a compressor driven by wind or water driven propeller or any number of other natural or waste heat power sources.

A further advantage of the two component radial cam rotary mechanism is that when provided rotational drive from an external source such as wind or water driven propeller or rotor, or other rotary motor or engine, the mechanism will provide a choice of effective source of compressed air or vacuum for immediate energy use or for storage for use in a tank as needed.

A further advantage of the two component Radial Cam Rotary Steam Engine is that its compact size, weight and physical shape make it ideal to be located in place of the "hub" of a wheel as is currently being done with electric motors. The use of this feature has multiple advantages with one being that a single vehicle, whether two, three or four wheeled, has the option of using an engine in only one of its wheels, or one in each of its wheels depending upon its power requirements.

A further advantage of this feature is that in situations where the vehicle is designed for warehouse or factory use, the engine(s) can be air driven with no indoor fossil fuel emissions.

A further significant advantage of the system is that its clean exhaust, when used as a steam engine, can be used to provide heat for heating a home or business, or for a heat exchanger to cool a home or business.

A further advantage of this design is that the decreased level of stress on the engines internal components results in increased life span and longevity over prior engine designs.

These together with other advantages of the Rotary Cam Radial Steam Engine, along with the various features of novelty, which characterize the design, are pointed out with particularity in the claims annexed to and forming a part of this disclosure. For a better understanding of the Rotary Cam Radial Steam Engine, its operating advantages and the specific objects attained by its uses, reference should be made to the accompanying drawings and descriptive matter in which there are illustrated preferred embodiments of the Rotary Cam Radial Steam Engine. There has thus been outlined, rather broadly, the more important features of the design in order that the detailed description thereof that follows may be better understood, and in order that the present contribution to the art may be better appreciated. There are additional features of the Rotary Cam Radial Steam Engine that will be described hereinafter and which will form the subject matter of the claims appended hereto.

The novelty of this application resides in a unique preferred embodiment of the Rotary Cam Radial Steam Engine, which is powered by the means of the low pressure and low temperature, from gases or fluids from an external source. These pressurized fluids can be generated from a mechanical pump, from solar generated steam or from gases created through heat or cold introduced to most any fluid or gas via a boiler or other mechanism. An engine of single or multiple pistons and cylinders which are driven lineally by the introduction of pressure from an external source, through a single, centralized rotating valve designed to provide timed introduction of the pressurized gasses into each cylinder at the moment determined to be best for the engine's applied use, and then the same single central rotating valve assembly at the appropriate moment opens to allow the used pressure to exhaust it into the atmosphere, or a collection system.

In a particularly preferred mode, the device can be coupled with a wind powered mechanical pumped for communication of the working fluid of pressurized air into the engine system. The turning blades of a windmill acted upon by the flowing wind can be employed to turn a mechanical pump for pressurizing air to a storage reservoir means. The stored pressurized air can then be communicated into the engine at the desired pressure for driving the pistons and cam.

In at least one preferred mode, the present invention provides lightweight multi piston rotary cam radial engine which is capable of providing a means to create a choice of rotational power by a variety of different means including steam, compressed air or vacuum, pressurized gases or fluids, or when driven by any number of natural or mechanical rotational forces such as a wind driven propeller or rotor, a stream driven "paddle wheel", or rotational engine or motor, produces a choice of vacuum, or air pressure.

The driven forces push the pistons in the Rotary Cam Radial Steam Engine in an outward direction from the center of the engine. Each piston and rod is combined as a single part or rigid assembly. The piston may have a top head section fastened to it, which is of a robust harder material than the body of the piston. Each piston is designed to contain one or more piston rings, or other sealing means, within an annular recess formed on the piston, to enhance compression by improving the seal in the expansion chamber between the moving piston and cylinder and head. A variety of piston rings can be used for this application but the preferred mode of piston ring is multiple wraps of flexible, low friction, high temperature resistant material such as TEFLON cord as this allows for easy replacement in areas where machined or molded o-rings are not readily available. However, it is also envisioned that the seal can be accomplished through the use of an o-ring or the like if available.

In addition, as noted previously, the robustness of the engine design and use of low pressure and low temperature working fluid for power, will also allow the piston to be sealed against the cylinder wall by generally unconventional materials, such as organic plant matter. For example, the engine design would allow a user in a remote area, such as a jungle, to employ elongated strips of plant matter such as bark or leaves, and wrap the material around the piston to provide an adequate temporary seal.

The stationary engine body of the engine will be designed with a central opening to fit the centrally rotating valve. There will be cavities in the outer part of the stationary engine body, which will locate and provide seals for the cylinders. There can be one cylinder or multiple cylinders in a radial pattern to the center of the engine. The stationary engine body of the engine will further have one or more openings within each of the cylinder-locating cavities designed to allow the powering pressurized fluid or gas into the cylinder during the power portion of the stroke, and out of the cylinder during the exhaust portion of the stroke.

The centrally located rotating valve will provide a common entrance point for pressurized fluids or gasses to enter into the half of the valve designed to provide timed entrance of the fluids/gasses into each cylinder. The overall diameter of the rotating valve may or may not be large enough to provide a "steam chamber" which will provide the benefit of a larger volume of steam. This steam will provide more available gas than would normally be provided for immediate use in the cylinders from a valve with no steam chest features. This centrally located valve can also be fed a fuel and oxygen mixture which can be ignited by a spark plug or glow plug in communication with each cylinder at the top of a compression stroke in a configuration of the device using internal combustion for power rather than a remotely generated power supply.

The centrally rotating valve assembly has cut into it a number of openings for introduction of the pressurized fluids/gasses or in the case of an internal combustion version, a fuel and air mix, and is designed to accommodate the same number of cam lobes located on the outer rotating cam ring. The upper set of openings will work as the intake openings and match the number of lobes on the outer rotating cam ring, while the lower set of openings will work as the exhaust openings and will also match the number of lobes on the outer rotating cam ring. The upper openings will be offset from the lower openings depending upon the length of the stroke of the pistons. These openings can be designed and manufactured to provide a precise volume of steam for a precise percentage of time that the cylinder will be moving during its power stroke. This timing determines the amount of steam allowed into the cylinder and when the supply of steam is cut off. The manipulation of this geometry affects the efficiency of the engine as well as the amount of power available through that particular cam, as well as the amount of steam usage in running the engine. The upper and lower locations of the intake and exhaust openings may be reversed providing equal efficiency and will remain within the scope of this application. The centrally rotating valve assembly in its second chamber provides similar openings, typically open through the entire exhaust stroke of each cylinder, timed with the position of the outer rotating cam ring which allows for the used and depressurized fluids/gasses to exit the cylinders. These fluids/gasses exit through a common exit point from the valve assembly and through one or more exhaust ports in the engines case.

Another feature of the engine is a port through the main body or base of the engine which would allow the first steam introduced to the engine to pass through the body or base only to be routed/ported after the body has reached a certain temperature most ideal for efficient running into the valve for distribution to the cylinders. This could be done with a simple thermostat and would allow the engine to be effectively run with no fear of water lock with the use of a less expensive source of steam which might normally provide "wetter" steam damaging the engine. Each piston will have a circular bearing and wheel located opposite of its piston head. This bearing wheel is designed to reduce friction and bear the pressure of the lineal movement of each piston during the pressurized portion of the piston's movement against the outer rotating cam ring. The Rotary Cam Radial Steam Engine's entire central structure including stationary engine body, cylinders and valves can be simply and fully enclosed by insulation to minimize heat loss, maximize thermal efficiency and quieting the engine.

Still further, in at least one preferred mode, the device includes a means for adjusting the valve timing through the provision of an adjustable timing component. Advantageously, the timing component can be engaged on the top of the 'stacked' arrangement of components such that the user does not have to remove any parts in order to make the desired adjustments.

The outer rotating cam ring will have the same number of "lobes" in its circumference as the number of ports in each of the intake and the exhaust sections of the central rotating valve. The valve and the outer cam lobes are timed to synchronize and maximize the efficiency of the power and exhaust strokes of the centrally rotating valve with the linear motion of the pistons to provide uniform forces against the radiuses in the outer rotating cam ring. The co-ordination of the above identified forces results in a powerful circular motion of the large outer rotating cam ring. The radii and angled surfaces of the external cam ring provide surfaces on which the pistons wheels push in their power stroke. The second half of the radii provide a returning force on the pistons to return them to their top dead center in preparation of their next power stroke. The mating geometry for the central valve assembly and the outer rotating cam ring configuration incorporates a locating provision, which allows the operator of the engine to easily reverse the direction of the rotation of the engine.

In at least one preferred mode, removable cam 'lobe' portions are provided which are removably engageable and replaceable from the rest of the cam ring. A plurality of different geometry lobe portions of varying radii and slope angle can then be provided. Thus, the user can selectively engage the desired 'lobe' portion having a predetermined radii and slope angle to provide a particular output of torque and horsepower without having to replace the entire cam ring.

The pistons in this engine have nothing restraining their movement in the outward lineal direction other than the outer rotating cam ring. There are no upward or downward forces on the valve/cam assembly. All of the forces on the assembly are outward from the force of the pistons, or inward from the compression lobe rotating against the pistons. However, in at least one preferred, a piston retainer means is provided which further limits the piston to strictly liner motion and eliminates the occurrence of any non-linear motions (sway or side-to-side torques) being communicated from the piston followers to the pistons. This can include a retainer ring having guide channels for each respective piston rod, wherein the channels restrict all non-linear movement of the piston assembly.

The preferred location of the cam follower track will be on the lower surface of the outer rotating cam ring so that in order to remove the valve cam assembly, outer rotating cam ring needs only to be lifted straight up, removing the centrally located rotating valve from its enclosure in the center of the stationary engine body. Once the cam/valve assembly has been removed, each piston can be removed from its cylinder by simply pulling it out of the cylinder. Replacement of the pistons is the reverse, simply fit the circular piston back into its open cylinder. The cam/valve assembly is re-fit in the same manor. Simply align the valve assembly with its housing in the stationary engine body and slip it down until it seats against its resting surfaces. The engine is ready to run again.

A first alternate embodiment of the Rotary Cam Radial Steam Engine is described incorporating six pistons but this does not limit the number of pistons in that a wide variety of numbers of pistons may be used and still remain within the scope of this application.

A second alternate embodiment of the Rotary Cam Radial Steam Engine will have a plurality of magnets incorporated as part of the outer rotating cam ring to be used as a generator/alternator armature, generally comprising a rotor/stator configuration. In the embodiment, the rotating cam ring, is engaged to a rotor ring assembly having an array of permanent magnets engaged thereto, which rotates in unison with the cam ring. A stator assembly employing one or a plurality of wire coil configurations is engaged to a stationary base and positioned such that the stator coils are in the magnetic flux area of the rotating magnets engaged upon the rotor. The stator assembly is preferably dissasemblable into two or more components such that the stator assembly can be disengaged from the engine without removal of any other engine components. Those skilled in the art will envision that the quantity, spacing, and strength of the magnets of the rotor, as well as quantity, material type, gauge, and number of windings in the coils of the stator, can be varied as needed to produce a desired electricity production given the RPM and horsepower setup of the engine. Thus, the device can have a kit of such stators, each of which has a different wiring configuration allowing for such.

The third alternate embodiment of the Rotary Cam Radial Steam Engine will use a machined or cast central housing which incorporates cavities to contain the piston cylinders. The third alternate embodiment will incorporate all the features of the preferred embodiment with the exception of using the machined or cast central housing and still remain within the scope of this application.

A fourth embodiment of the engine uses what is identified as a uniflow exhaust system. This embodiment will have a set of exhaust holes located radially in each cylinder of the engine around which is located an exhaust collection manifold with seals in it to insure no loss of exhaust gasses/fluids. The holes in the cylinders are located at the bottom of the piston stroke so that as the piston reaches the bottom of its stroke, the gasses/fluids are allowed to exit the cylinder through the holes into a manifold system designed to collect them. When the exhaust passes into the manifold system, it is directed to a common area to be dispersed either into the atmosphere, or into an area for collection for re-use or condensation and re-use. A condenser component may be employed for converting the steam exhaust back into water as needed.

The uniflow embodiment of the Rotary Cam Radial Steam Engine will use a different configuration of the centrally rotating valve assembly. The entire central portion of the valve would be dedicated to the intake-power portion of the cycle. There would be only one chamber in this embodiment of centrally rotating valve assembly and one opening per lobe on the outer rotating cam ring. The prior described valve will also work in this embodiment.

A fifth embodiment of the engine would incorporate the advantages available through including a combination of different sized pistons/cylinders "re-use" of exhaust steam pressure within the Rotary Cam Radial Steam Engine being fed into a cylinder displacement larger than the previous which can provide additional power through the reuse of what would normally be lost heat/energy in the form of exhaust. This embodiment will have a set of exhaust holes located radially in each cylinder of the engine around which is located an exhaust collection manifold with seals in it to insure no loss of exhaust gasses/fluids. The holes in the cylinders are located at the bottom of the piston stroke so that as the piston reaches the bottom of its stroke, the gasses/fluids are allowed to exit the cylinder through the holes into a manifold system designed to direct them through tubes to the next larger cylinder in line greatly increasing the efficiency of the engine. When the exhaust passes out into the manifold system of the largest cylinder, it is directed to a common area to be dispersed either into the atmosphere, or into an area for collection for re-use or condensation and re-use. Again, a condenser component communicating with the exhaust manifold may be employed for converting the exhaust back into water as needed.

In at least one preferred mode, the invention comprises as a low temperature and low pressure steam or compressed-air powered alternator. Its steam or compressed air requirements are small and simple enough for it to be considered a waste heat system designed to run from energy typically "thrown away" into our environment or created through natural resources such as sun, geothermal, wave or stream action and others which are normally neglected as a power source.

With a simple adjustment of an open access adjustment component, this engine can also be used very effectively as a vacuum driven engine, a vacuum pump, or an air compressor. Besides steam, it can also be run on low pressure air which can be created through the use of a simple air compressor, even itself being driven as an air compressor.

With an adjustment of its valve to cam feature, it can be used as a vacuum driven engine/alternator. The design uses two separate components which when combined produce an engine, compressor or vacuum pump. The number of power strokes per single revolution can be changed in this design by hand, a tool less change out of the valve/cam assembly of the system which takes seconds. This change can result in nearly double or halving of the number of power strokes per single revolution which results in a near doubling or halving of the power produced, or valuably, of the economy of fuel requirements to drive the system. The multiple cylinder engine body can be disassembled and reassembled by hand without the use of tools by someone with little mechanical ability and in minimal time. The simplicity of design around multipurpose parts results in a much smaller number of parts in the system and provides very affordable manufacture of the system with simple and affordable full maintenance by an unskilled owner. Additional embodiments are also envisioned, and are described in more detail below.

With respect to the above description then, it is to be realized that the optimum dimensional relationships for the parts of this application, to include variations in size, materials, shape, form, function and manner of operation, assembly and use, are deemed readily apparent and obvious to one skilled in the art. All equivalent relationships to those illustrated in the drawings and described in the specification intend to be encompassed by the present disclosure. Therefore, the foregoing is considered as illustrative only of the principles of the Rotary Cam Radial Steam Engine. Further, since numerous modifications and changes will readily occur to those skilled in the art it is not desired to limit the design to the exact construction and operation shown and described, and accordingly, all suitable modifications and equivalents may be resorted to, falling within the scope of this application.

BRIEF DESCRIPTION OF THE DRAWINGS

The accompanying drawings, which are incorporated in and form a part of this specification, illustrate embodiments of the Rotary Cam Radial Steam Engine and together with the description, serve to explain the principles of this application.

FIG. 9 depicts an exploded perspective view of the preferred embodiment of the Rotary Cam Radial Steam Engine illustrating in greater detail the construction of one piston assembly.

FIG. 10 depicts a bottom view of the second alternate embodiment of the Rotary Cam Radial Steam Engine exposing a plurality of permanent magnets to be used as a generator armature.

FIG. 19 depicts a bottom view of the fifth alternate embodiment of the Rotary Cam Radial Steam Engine using a combination of different sized piston cylinders.

FIG. 20 depicts a perspective view of the stationary engine body of the fifth alternate embodiment of the Rotary Cam Radial Steam Engine.

FIG. 21 a schematic top view of the fifth alternate embodiment of the Rotary Cam Radial Steam Engine illustrating the direction of exhaust flow.

FIG. 22 shows perspective view of a particularly preferred mode of the piston, employing fluid channels for communicating at least some of the pressurized air or steam to the piston seal engaged within a piston seal recess, providing a self-renewing positive pressure of the seal against the cylinder wall.

FIG. 22a shows a detailed view depicting a preferred tapered upper and lower surface of the piston seal recess.

FIG. 23 shows a side view of a preferred mode of the piston assembly employing the piston of FIG. 22.

FIG. 24 shows another side view of the piston assembly of FIG. 23.

FIG. 25 shows a bottom view of another preferred mode of the piston cylinder having a chambered leading edge for easy insertion into the cylinder locating cavity of the engine body (as well as a seat for an o-ring seal) and an exhaust port for a uniflow type exhaust, which would not exist in the non-uniflow exhaust system.

FIG. 26 shows a side view of another preferred mode of the engine body.

FIG. 27 shows a partial assembled view of the engine body of FIG. 26 with the piston assembly of FIGS. 23 and 24.

FIG. 28 shows a perspective view of a particularly preferred piston retaining ring which provides a means for retaining the cylinders against the engine body, and restricting the pistons rods to strictly linear motion.

FIG. 29 depicts a top view of the piston retaining ring of FIG. 28.

FIG. 30 shows a perspective view of another preferred mode of the exhaust manifold.

FIG. 31 a view of the engine body with six pistons and cylinders, also depicting the engagement of the retainer ring and exhaust manifold.

For a fuller understanding of the nature and advantages of the Rotary Cam Radial Steam Engine, reference should be made to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Figure 1:
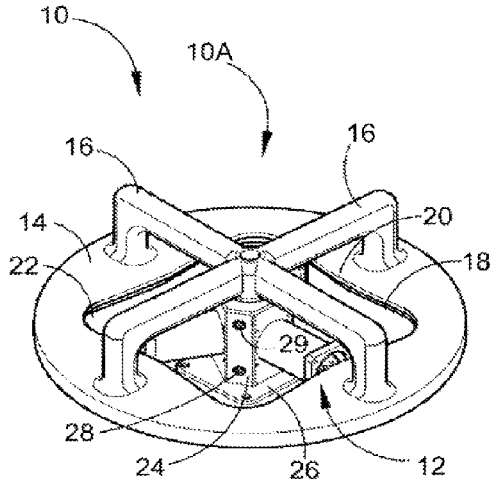
FIG. 1 depicts a perspective top view: of the preferred embodiment of the Rotary Cam Radial Steam Engine using three pistons.

Referring now to the drawings in FIGS. 1-46, wherein similar parts of the Rotary Cam Radial Steam engine 10 are identified by like reference numerals, there is seen in FIG. 1 a perspective top view of the preferred embodiment of the Rotary Cam Radial Steam Engine 10A using three piston assemblies 12. The Rotary Cam Radial Steam engine 10 has been depicted in the horizontal position but it must be understood that the Rotary Cam Radial Steam engine 10 can operate in a wide variety of positions including vertical and still remain within the scope of this application. The outer rotating cam ring 14 with the supporting frame 16 incorporating a unique cam follower track or race 18 is configured with four compression lobes 20 and four exhaust cavities 22. It must be fully understood at this time that the Rotary Cam Radial Steam engine 10 can be configured with one, or more piston assemblies 12, two or more compression lobes 20 and two or more exhaust cavities 22 on an external rotating cam ring 14 while remaining within the scope of this application. The stationary engine body 24 is fixed to the engine mounting base plate 26 to be attached to a supporting structure. The stationary engine body 24 and the three-piston assemblies 12 remain in a fixed position while the outer rotating cam ring 14 rotates around a central axis. One or more engine body exhaust ports 28 is shown in the lower surface of the stationary engine body 24 along with ones or more engine intake.

The engine body 24 may be provided in a plurality of configurations for operative engagement of any number of piston assemblies 12 with the operative communication of valves for intake and exhaust from each. Provided as a kit of bodies 24 each configured for a differing number of piston assemblies 12 the user can easily assemble an engine having the desired number of piston assemblies 12 extending therefrom. A plurality of matching cam rings 14 with races matched to the number of piston assemblies 12 can also be provided in a kit. Because of the ease of assembly and disassembly, a user can easily dismantle and build an engine with the desired power output using a chosen number of cylinders and pistons with the correct cam ring 14.

Figure 2:
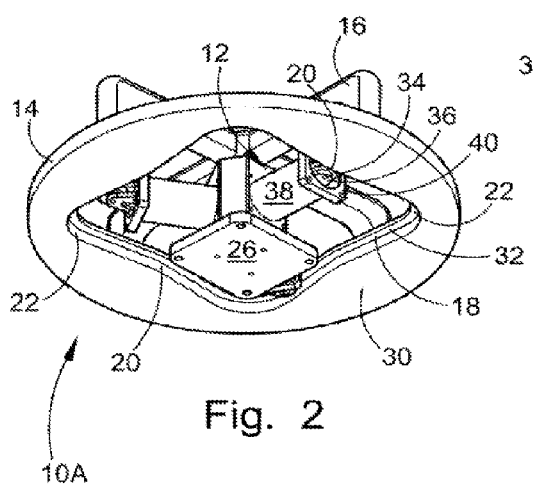
FIG. 2 depicts a perspective bottom view of the preferred embodiment of the Rotary Cam Radial Steam Engine using three pistons.

FIG. 2 depicts a perspective bottom view of the preferred embodiment of the Rotary Cam Radial Steam Engine 10A using three piston assemblies 12, four compression lobes 20 and four exhaust cavities 22. This illustration shows the outer rotating cam ring 14 lower surface 30 and the cam roller shelf 32 located within the cam follower track or race 18. The piston cam roller 34 is visible at the upper end of the piston 36 resting within the piston cylinder 38 and held in place by the means of a cylinder retainer 40.

Figure 3:
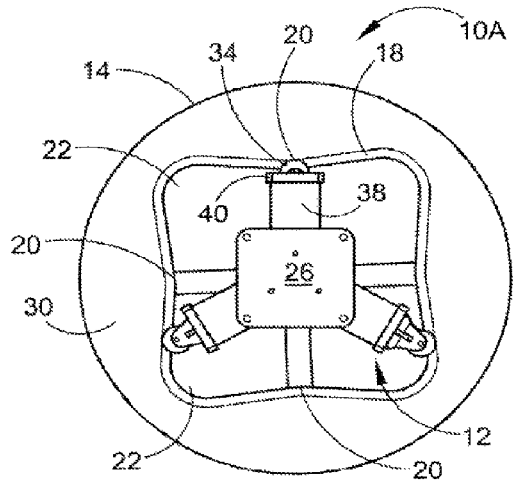
FIG. 3 depicts a bottom plan view of the preferred embodiment of the Rotary Cam Radial Steam Engine using three pistons.
Figure 4:
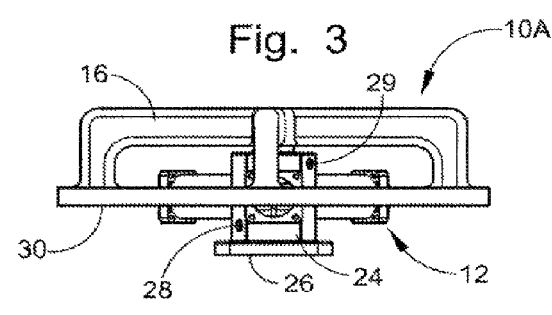
FIG. 4 depicts a side view of the preferred embodiment of the Rotary Cam Radial Steam Engine using three pistons.
Figure 5:
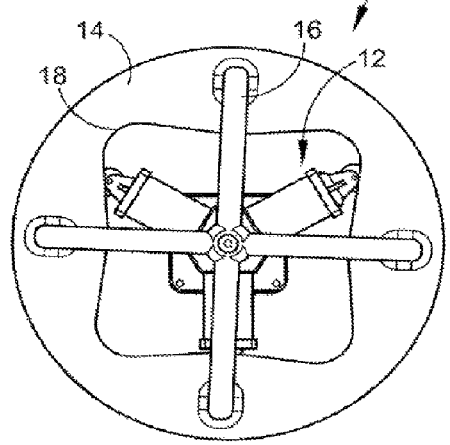
FIG. 5 depicts a top plan view of the preferred embodiment of the Rotary Cam Radial Steam Engine using three pistons.

FIG. 3 depicts a bottom plan view of the preferred embodiment of the Rotary Cam Radial Steam Engine 10A using three piston assemblies 12. FIG. 4 and FIG. 5 depicts a side view and top plan view of the preferred embodiment of the Rotary Cam Radial Steam Engine 10A using three piston assemblies 12.

Figure 6:
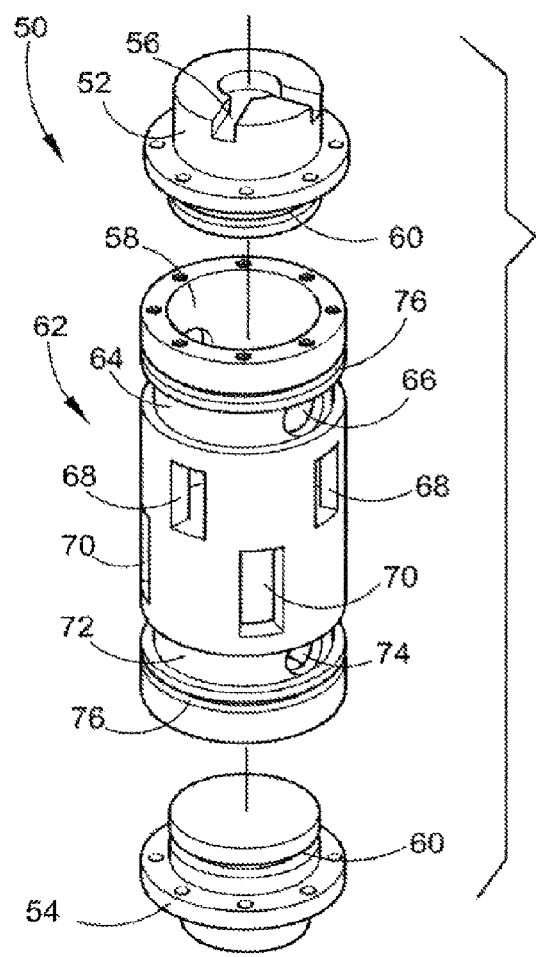
FIG. 6 depicts an exploded perspective view of the central rotating valve with the top and bottom cap removed.
Figure 7:
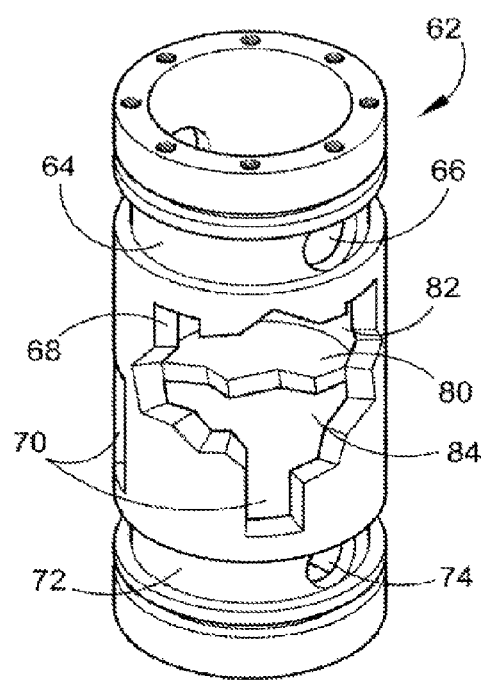
FIG. 7 depicts a perspective view of the central rotating valve with side broken away to expose the internal divider section.

FIG. 6 depicts an exploded perspective view of the central rotating valve assembly 50 with the upper cap 52 and the lower cap 54. The upper cap 52 has a forward and a reverse rotational direction slot 56 on the upper surface. The upper cap 52 engages within the steam chest area 58 of the central rotating valve 50 and seals by the means of an o-ring in the o-ring recess 60. The exterior surface of the central rotating valve 62 consists of a valve intake groove 64 with one or more main intake ports 66 into the steam chest area 58. One or more intake openings 68 lead into piston cylinder 38 and one or more exhaust openings 70 release the pressure into the lower steam chest cavity 84 depicted in FIG. 7, where it is ducted out through one or more main exhaust ports 74, and into the valve exhaust groove 72. O-ring grooves 76 at the top and bottom of the central rotating valve 50 seal the device within the rotating valve cavity 78 in the stationary engine body 24. FIG. 7 depicts a perspective view of the central rotating valve 62 with the side broken away to expose the internal divider section 80 and the upper steam chest cavity 82 and lower steam chest cavity 84.

Figure 8:
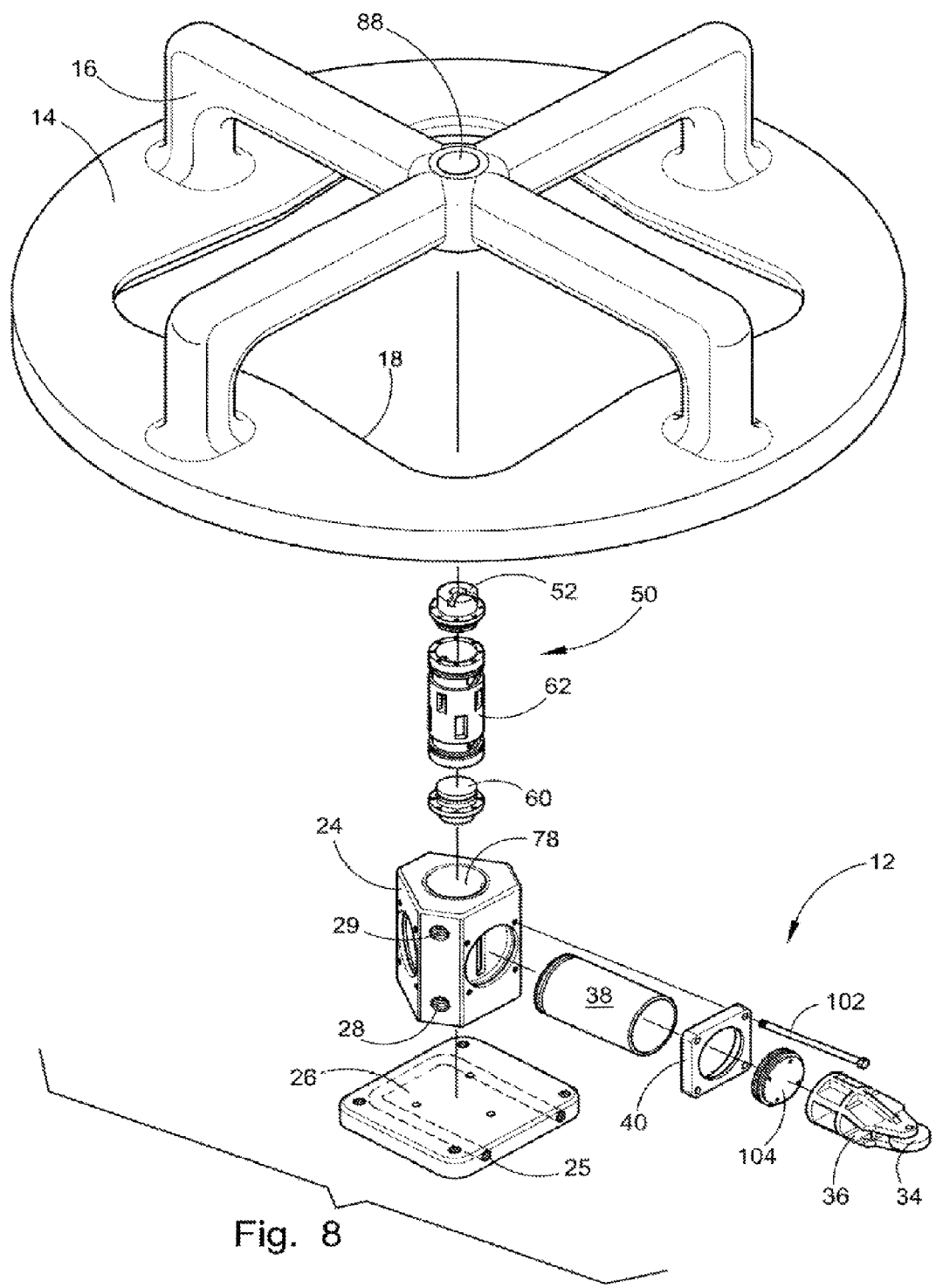
FIG. 8 depicts an exploded perspective view of the preferred embodiment of the Rotary Cam Radial Steam Engine using three pistons and illustrating the construction of one piston assembly.

FIG. 8 depicts an exploded perspective view of the preferred embodiment of the Rotary Cam Radial Steam Engine 10A where the outer rotating cam ring 14 is shown above the central rotating valve assembly 50, the stationary engine body 24 and the piston assembly 12. The piston assembly has threads. The central rotating valve assembly 50 will be fixably attached to the supporting frame 16 in the Rotating valve mounting orifice 88.

FIG. 9 depicts an enlarged exploded perspective view of stationary engine body 24 and the piston assembly 12 of the preferred embodiment of the Rotary Cam Radial Steam Engine 10A. Cylinder locating cavity 94 with an o-ring groove 96 sealing the piston cylinder 38 are shown on the sides of the stationary engine body 24. The stationary engine body 24 has an optional pre-heat chamber 25 that is a port through the Engine mounting base plate 26 that will allow the first steam introduced to the engine to pass through the stationary engine body 24 only to be routed/ported after the body has reached a certain temperature most ideal for efficient running into the central rotating valve assembly 50 for distribution to the cylinders 38. An elongated slot 98 is located on the back wall 100 of the locating cavity 94 extending into the upper steam chest cavity 82 and lower steam chest cavity 84. One or more engine bore exhaust ports 28 enter into the rotating valve cavity 178 along with one or more engine intake ports 29 that are in alignment with the valve intake groove 64 in the central rotating valve 62. The piston cylinder 38 with optional threads 92 is shown adjacent to the cylinder retainer 40 that will be secured to the Stationary engine body 24 by the means of four cylinder mounting bolts 102. The cylinder 38 can also be retained to the main body 24 by means of threaded connection on each directly connecting the two pieces. A piston 104 with one or more o-ring groove 106 secured to the piston 36 moves independently within the piston cylinder 38.

FIG. 10 depicts a bottom view of a second alternate embodiment of the Rotary Cam Radial Steam Engine 10C exposing a plurality of permanent magnets 110 imbedded into the rotating cam ring lower surface 30 to be used as a generator armature.

Figure 11:
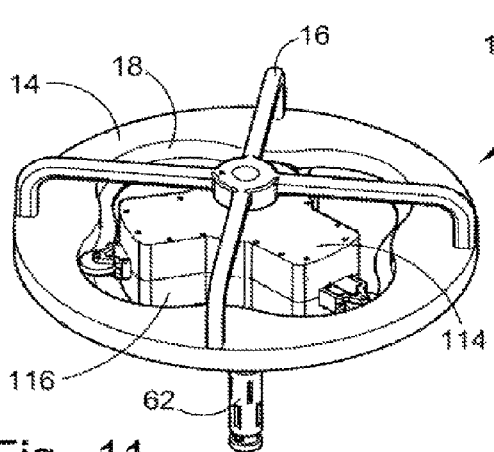
FIG. 11 depicts a top perspective view of a third alternate embodiment of the Rotary Cam Radial Steam Engine using a cast central housing.
Figure 13:
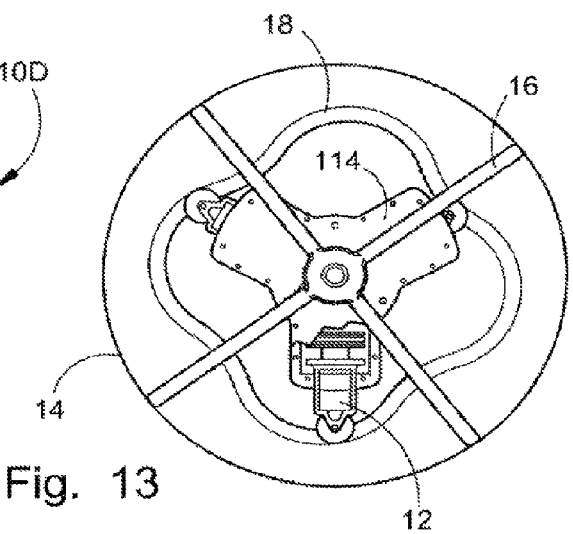
FIG. 13 depicts a top plan view of a third alternate embodiment of the Rotary Cam Radial Steam Engine using a cast central housing with a portion of the lower cylinder broken away exposing the location of the piston assembly.
Figure 12:
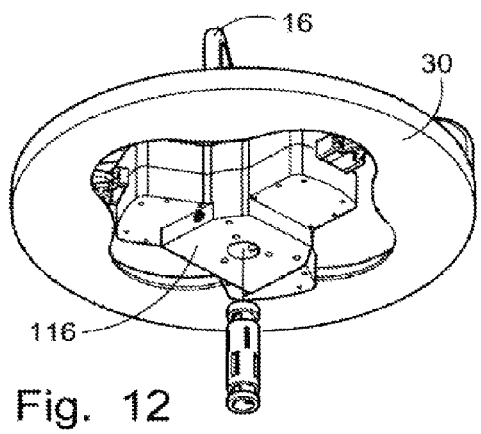
FIG. 12 depicts a bottom perspective view of a third alternate embodiment of the Rotary Cam Radial Steam Engine using a cast central housing.
Figure 14:
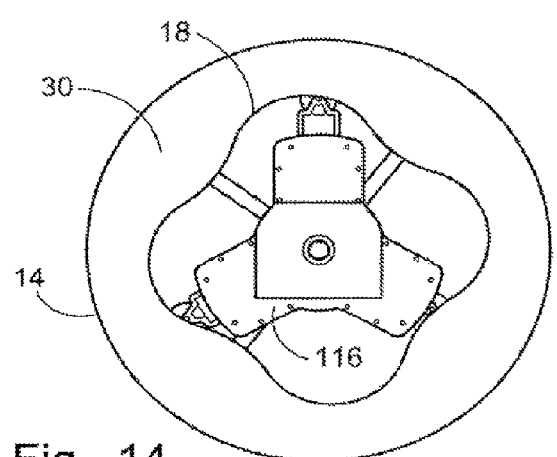
FIG. 14 depicts a bottom view of a third alternate embodiment of the Rotary Cam Radial Steam Engine using a cast central housing.
Figure 15:
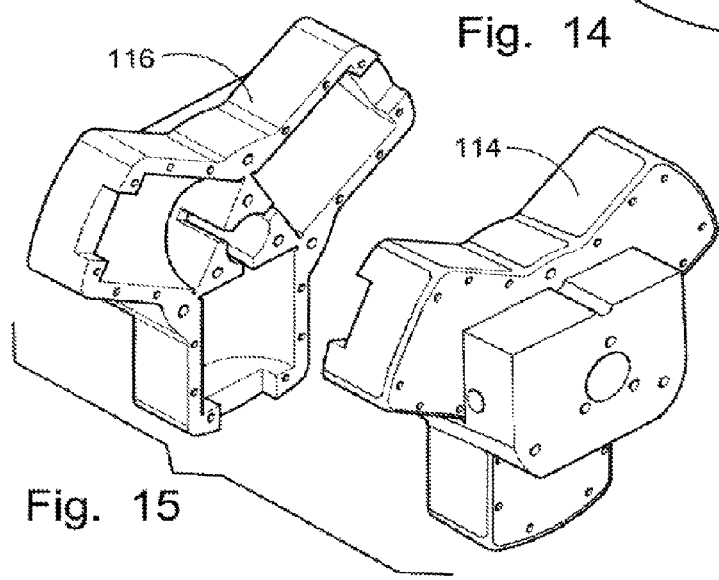
FIG. 15 depicts an exploded perspective view of both sections of the cast central housing, namely, the upper cast central housing and the lower cast central housing.
Figure 16:
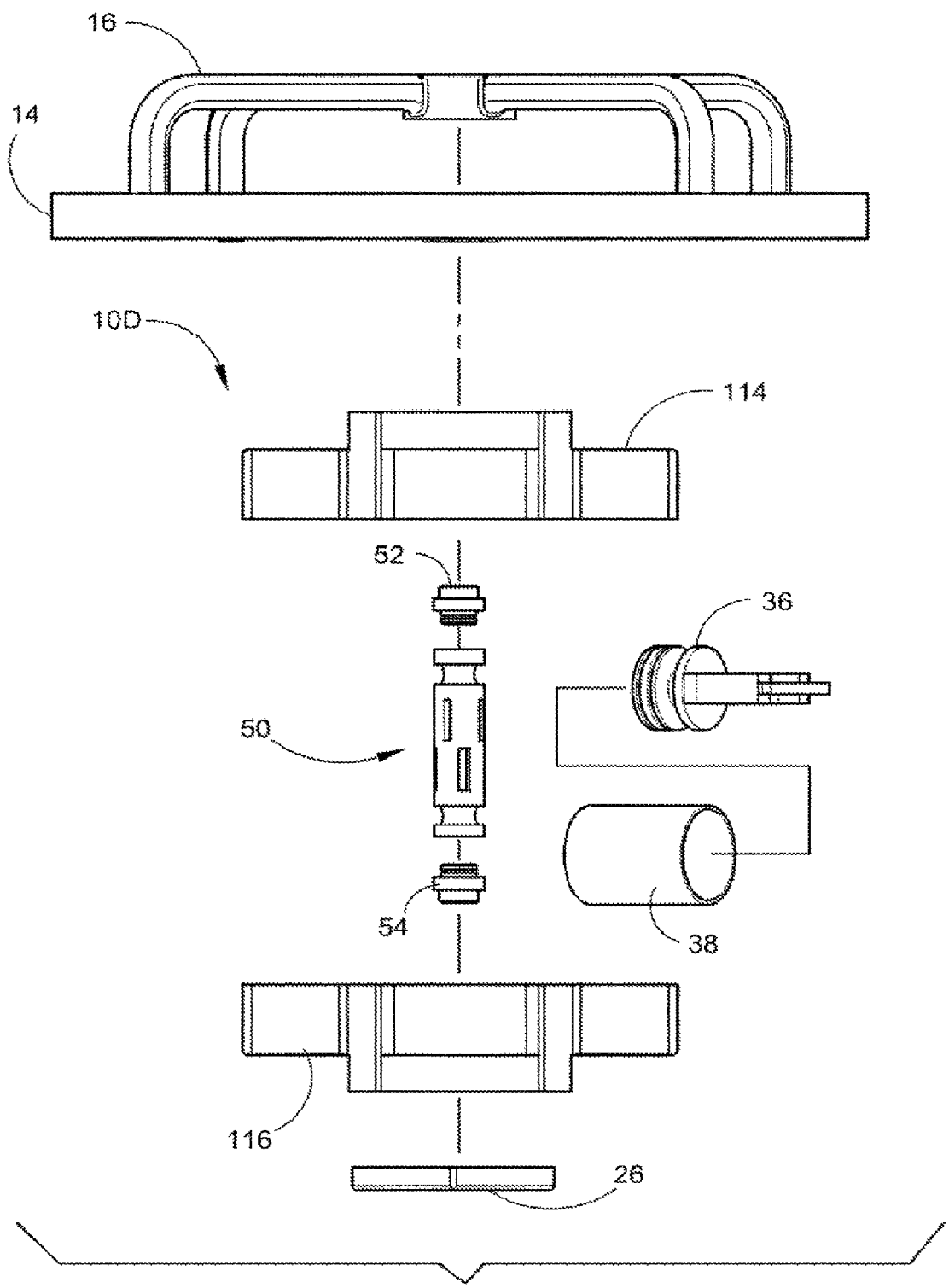
FIG. 16 depicts an exploded view of both segments of the third alternate embodiment of the Rotary Cam Radial Steam Engine using a cast central housing.

FIG. 11 depicts a top perspective view of a third alternate embodiment of the Rotary Cam Radial Steam Engine 10D using cast central housing halves 114 and 116 retaining the piston cylinder 38. The outer rotating cam ring 14 and the central rotating valve 62 can be typical throughout all of the embodiments of the Rotary Cam Radial Steam engine 10. FIG. 12 depicts a bottom perspective view of a third alternate embodiment of the Rotary Cam Radial Steam Engine 10D. FIG. 13 depicts a top plan view of a second alternate embodiment of the Rotary Cam Radial Steam Engine 10D with a portion of the lower cylinder broken away exposing the location of the piston assembly 12. FIG. 14 depicts a bottom view of the third alternate embodiment of the Rotary Cam Radial Steam Engine 10D. FIG. 15 depicts an exploded perspective view of both typical sections of cast central housing 116. FIG. 16 depicts an exploded side view of a third alternate embodiment of the Rotary Cam Radial Steam Engine 10D illustrating both the top half of the cast central: housing 114 and the bottom half of the cast central housing 116 also illustrating the piston 36 and the piston cylinder 38.

Figures 17, 18:
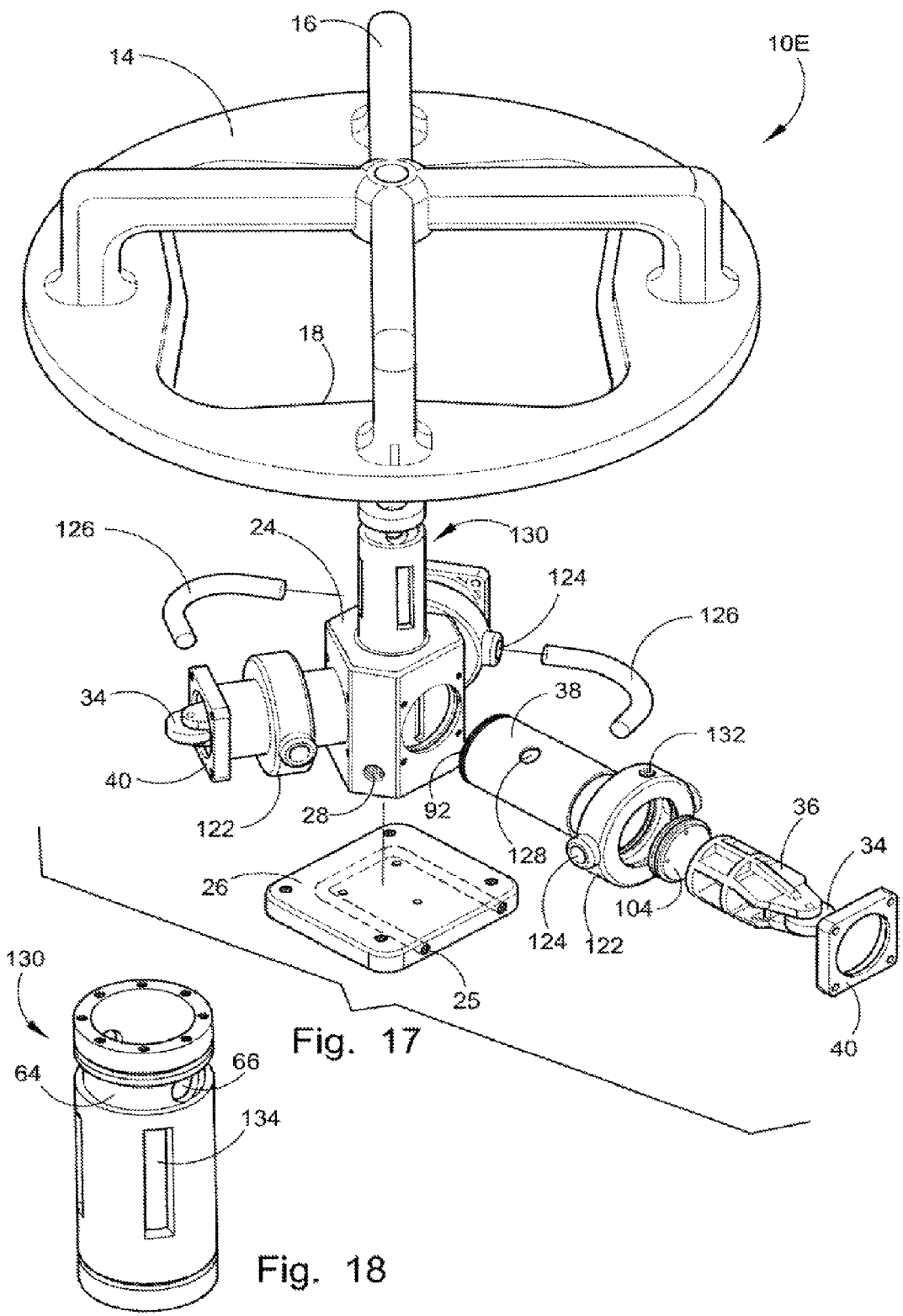
FIG. 17 depicts an exploded perspective view of a fourth alternate embodiment of the Rotary Cam Radial Uniflow Steam Engine using the basic configuration of the preferred embodiment of the Rotary Cam Radial Steam Engine.
FIG. 18 depicts a perspective view of the optional uniflow central rotating valve.

FIG. 17 depicts an exploded perspective view of a fourth alternate embodiment of the Rotary Cam Radial Uniflow Steam Engine 10E. This engine uses the basic configuration of the preferred embodiment of the Rotary Cam Radial Steam Engine 10 except for exhaust 122 with orifices 124 leading to interconnecting exhaust elbows 126 covering one or more uniflow exhaust ports 128 in each of the piston cylinders 38. The exhaust is then emitted through an exhaust port 132 in the exhaust manifold 122.

FIG. 18 depicts a perspective view of the optional uniflow central rotating valve 130 having only the intake port 66 along with the valve intake groove 64, with the exhaust totally removed by the means of the uniflow exhaust ports 128 in the piston cylinders 38. This uniflow central rotating valve assembly 130 would not have the exhaust port 70 that is used in the previously described central rotating valve 62. Another difference between this central rotating assembly 130 and the previously described central rotating valve 64 is the presence of the elongated slot intake opening 134.

FIG. 19 depicts a bottom view of the fifth alternate embodiment of the Rotary Cam Radial Steam Engine 10F using a combination of different sized piston cylinders assemblies 138, 140 and 142.

FIG. 20 depicts a perspective view of the stationary engine body 144 of the fifth alternate embodiment of the Rotary Cam Radial Steam Engine 10F where only one of the cylinder locating orifice back walls 100 has an elongated slot 98 in it and the others are solid. This is because the exhaust is directed from the other exhaust ports.

FIG. 21 a schematic top view of the fifth alternate embodiment of the Rotary Cam Radial Steam Engine 10F illustrating the direction of exhaust flow. This view/illustration shows the exhaust being collected at the prior and smaller cylinder 138 in one of the exhaust manifolds 122 and directed towards the case to cylinder joint area where the piston will be then driven outward lineally until the top of the piston has reached the uniflow exhaust area for the exhaust gasses to be exhausted and directed to the next larger piston 140, or out of the engine in the case of the last piston 142 to make use of the exhaust steam.

FIG. 22 shows perspective view of another particularly preferred mode of the device with the piston cap or piston 104 configured with one or a plurality of fluid channels 105 communicating from a first end at an opening in the top surface 107 of the pistons 104 and along a conduit behind the sidewall of the piston 104 to a second end communicating with the seal 109 situated in the pistons sealing ring groove 106.

These channels 105 provide a means for communicating a small volume of pressurized air or steam from the piston/cylinder chamber into the rear/central wall of the piston sealing ring recess 106 and thereby communicate a volume of pressurized gas behind the rings, which provides a bias to the opposite side of the sealing ring, or wraps of sealing ring material such as flexible TEFLON chord urging it toward the cylinder walls within the cylinder chamber/cavity 38 and providing an enhanced seal between the piston 104 and cylinder walls 38.

Thus, a constant—adjusting and self renewing positive pressure force of the sealing wrap of material is biased toward and against the cylinder 38 interior wall throughout the power cycles of the piston. Those skilled in the art may envision other means for a self-renewing piston seal which may slightly or moderately differ than the preferred mode currently show, however without departing from the scope and intent of this invention are anticipated.

In this or other preferred mode, the seal can be provided by a conventional o-ring, or may be comprised of a plurality of wraps of a suitable high temp, low friction material, such as TEFLON, within the recess 106. However it is noted that it is of particular further advantageous utility of the present invention that the internal pressure, self-renewing features will allow the short term effective use of non-conventional materials to be employed as a sealing means such as cotton chord or many materials capable of making numerous wraps within the pistons sealing recess. Even with the wear of the non-conventional material seal, the self-renewing internal pressure feature will maintain an adequate seal over a prolonged period of time until a more efficient replacement can be acquired. It is noteworthy that due to the low pressures and temperatures required to run this engine, very low friction materials such as TEFLON or PEET can be employed with quality longevity in use as the piston. The use of this type of low friction material—when combined with the self adjusting and self renewing features of the piston sealing system—coupled with the ability to eliminate the length of piston skirt normally associated with a piston essentially eliminates the requirement of providing a petroleum based lubricant to prevent galling and destruction of the piston.

The pistons 12 have this novel sealing ring design in which a seal material can be a soft chord type material ideally made of a flexible TEFLON or high heat, low friction material which can be wrapped several times around the pistons sealing ring recess 106. The channels 105 allow a pressure equal to that existing inside the cylinders chamber to provide pressure moving the flexible wraps of material being used as the sealing feature outward against the cylinder wall. This feature alone will produce an excellent seal for the piston 12 to cylinder 38 seal.

However, in addition, the recess 106 cut into the piston 12 to accept the flexible sealing wraps of material have a further enhancing feature. In FIG. 22a, there is shown a detailed view depicting the upper 101 and lower 103 surfaces of the sealing ring recess 106 being slightly tapered with the smaller size of the recesses 106 taper being on the inward side of the recess 106 and the large dimension of the taper existing on the radially outward opening of the recess 106.

The physics of this relationship provides a natural physical "encouragement" resulting from both outward tapered piston seal recess 106 responding to the pistons 12 motion, in either direction, and the pressures presented from the rear of the soft material wraps—to move the soft wraps of sealing material outward and against the cylinder 38 walls providing an excellent and constantly self adjusting and renewing seal.

A further valuable advantage of this novel system is that by using a number of wraps of the sealing material positioned around the sealing ring recess 106, there is no cut in the recess 106 as is required with a metal or even hard plastic or composite ring as is required to install the ring over the piston surfaces to locate it in its groove receptor. This leads to a further advantage in that most pistons require at least 2 rings to help compensate for the lost leakage of pressure that results from the requirement of a slit opening in the rigid ring. A final, and very valuable advantage of this design of piston 12 and ring is that because the ring material can be flexible and further has a pressure constantly pushing it outwards and groove geometry encouraging the same to provide a quality seal, the seal will remain quality, with no influence through the eventual wear that exists in a metal, plastic, ceramic or other composite of piston ring as commonly exists in piston engines.

FIG. 23 shows a first side view of another preferred mode of the piston assembly 12 employing the piston 104 of FIG. 22. In this mode an elongated substantially rectangular piston rod 37 is provided and communicates between the piston 104 at one end and the rotational cam follower 34 at the opposite end. Further it is intended that the cam follower 34 and piston 104 are asymmetrically aligned with the central axis of the piston rod 37 as clearly shown in the figure. The off center extension of the cross section of the piston rod 37 as shown, provides geometry in the rod which allows its close tolerance engagement within the track 148 of the FIG. 28 and FIG. 29 retaining ring feature.

This engagement feature prevents the inherent side forces which are created as a result of the alternating angle of the cam geometry creating side forces acting on the piston and rods lineal motion. It is the unrestrained transfer of these forces to the piston/cylinder mating surfaces that are responsible for the unwanted friction responsible for the wear and loss of energy in the piston to cylinder surfaces. FIG. 24 shows another side view of the piston assembly 12 of FIG. 23.

FIG. 25 shows a bottom view of another preferred mode of the piston cylinder 38 having a chambered leading edge 129 for easy insertion of the cylinder 38 into the cylinder locating cavity 94 of the engine body 145 half, of the two piece construction which employs the retaining ring 146 to maintain the cylinders 38 in place and to provide defined pathways for piston and rod translation when powered by expanding or pressurized fluid.

Uniflow exhaust ports 128 communicating through the cylinder wall are also provided for each cylinder 38. In the mode of the engine device 10G shown in FIG. 38 below, the engine exhaust is directed downward toward an exhaust manifold 154. A registering notch 131 disposed at the terminating edge opposite the leading edge 129 of the cylinder 38 is also provide and may be employed to register the cylinder 38 in an engagement with a complimentary protrusion 93 disposed within the cylinder retaining cavity 150 of the retaining ring 146 as shown in FIG. 29. Thus the registered engagement will provide a means for properly aligning the exhaust port 128 in a relative downward orientation.

FIG. 26 shows a side view of another preferred mode of the engine body 145 providing a uniflow engine device 10G. This mode of the body 145 includes a rotating valve cavity 78 communicating with six cylinder locating cavities 94 for employment with six of the piston assemblies 12 shown in FIGS. 23 and 24. Further, it is noted that this mode of the body 145 is especially well designed for cast molding in either metal or plastic materials as deemed suitable for the manufacturers intended purpose. FIG. 27 shows a top partial assembled view of the engine body 145 of FIG. 26 with piston assemblies 12 of FIGS. 23 and 24. It is additionally noted that in this mode the cylinders 38 are not required to have threads to engage to the body 145 and may instead engage within the locating cavities 94 via tight clearance tolerance of the cylinder 38 exterior diameter and the diameter of the cavity 94 or may employ o-ring seals if desired. Thus the current mode of the engine body 145, cylinders 38, and piston assemblies will facilitate a high ease of use by an unskilled user for servicing or replacing parts.

FIG. 28 shows a perspective view of a particularly preferred piston retaining ring 146 providing a means for retaining the pistons 12 to strictly linear motion. In use the retainer ring 146 can be employed in a stacked configuration of the components of the device 10G positioned underneath the engine body 145 for engaging the piston rods 37 and cylinders 38. As shown, there are included six piston rod lineal guide tracks 148 corresponding to the current preferred six piston mode of the device 10G. In use, the wider offset portion of the asymmetric piston 12 is engaged within the lineal guide track 148 which provides linear guide during the reciprocating motion of the pistons 12. By incorporating the linear guide features of the retainer ring 146, all non-linear movements and forces of the piston 104 against the cylinder wall conventionally resulting from the interaction of the piston 12 with the cam ring 14, are eliminated. Again, no tools are required to install or remove the retainer ring 146.

The retaining ring feature FIGS. 28 and 29 also includes cylinder retaining cavities 150 which are preferably precision fit machined for securely retaining the cylinders 38 in their engagement in the locating cavities 94 of the body 145 without the use of fasteners, such as threads as previously disclosed. Further, the retaining ring 146 includes exhaust ports 152 within the cylinder retaining cavities which are intended to align with the exhaust ports 128 of the cylinders 38 for communicating the exhaust to the exhaust manifold 154 operatively stacked in the position there below. FIG. 29 depicts a top view of the piston retaining ring 146 of FIG. 28. It is noted that the provision of linear guide means provided by the retainer ring 146 can be incorporated into other embodiments of the engine 10, and should not be considered limited to the current six cylinder figure and mode only. It is additionally noted that the retaining ring 146 in at least one preferred mode is as a one piece component, however ether modes are envisioned wherein the ring 146 can be constructed of more than one piece with effective results.

FIG. 30 shows a perspective view of another preferred mode of the exhaust manifold 154 currently having six exhaust intake apertures 156 communicating with one or a plurality of exit apertures 158 via an annular passage 157 shown in the cut-a-way. The exhaust manifold 154 can be plastic molded from high temperature clear or colored plastics. This manifold 154 could also easily be formed via sand casting in aluminum or any other material with a sand core in the mold that can be disposed of in the same manor that sand casting central core are removed from their casting.

FIG. 31 shows a view of the engine body 145 with six pistons 12 and cylinders 38, also depicting the engagement of the retainer ring and exhaust manifold. An upper cavity portion 79 of the body 145 may be configured to receive a bearing (not show) to interface between the stationary body 145 and the rotating connector 180 employed for engaging the rotor assembly 164.

Figure 32:
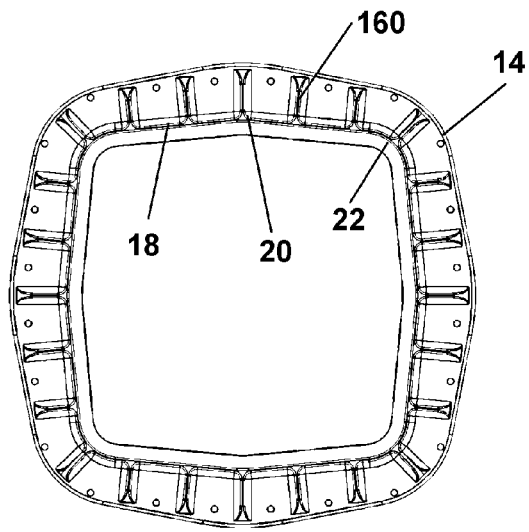
FIG. 32 shows a top view of another preferred mode of the rotating cam ring.

FIG. 32 shows a top view of another preferred mode of the rotating cam ring 14 having a cam follower track or race 18 formed of various lobes 20 and cavities 22 with sloped surfaces communicating therebetween. However in the current mode the apex of the lobe 20 extends radially outward from an imaginary centerline of the ring 14. Thus as the piston 12 traverses the track or race 18 past the lobes 20, the cam follower 34 always maintains a positive engagement with the track or race 18. This differs from previous modes of the device 10 wherein the lobes 20 extend radially inward toward the centerline (shown clearly in FIG. 3), and during higher RPM's the cam follower 34 may inadvertently loose contact with the track or race 18 as the follower 34 traverses over the inwardly extending lobe 20. In this mode the cam ring 14 also include a plurality of cooling fins 160 for cooling purposes and/or providing a heat sink means for the ring 14.

Figure 33:
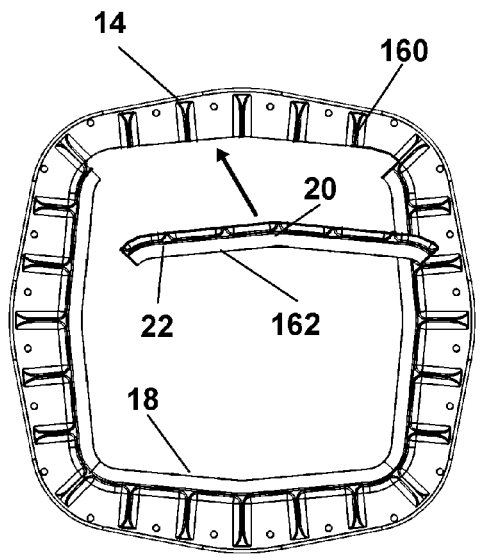
FIG. 33 shows a top view of still another preferred mode of the rotating cam ring employing removably engageable lobe portions for torque and horse power tuning.
Figure 34:
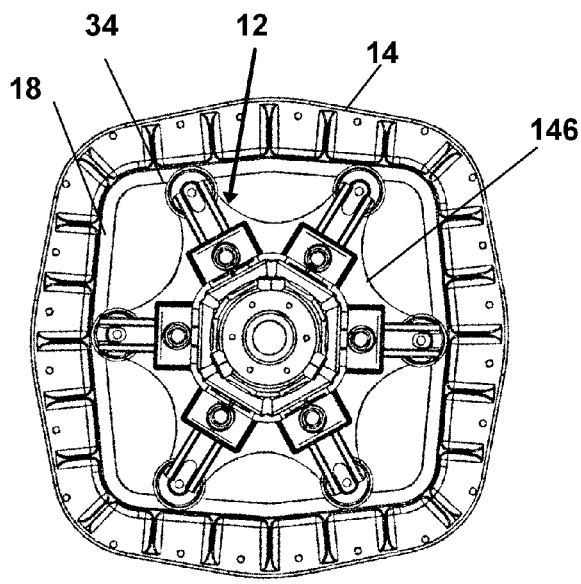
FIG. 34 depicts a bottom view of the engine body assembly of FIG. 31 engaged to the cam ring of FIG. 32.

FIG. 33 shows a top view of still another preferred mode of the rotating cam ring 14 employing removably engageable lobe portions 162 for torque and horse power tuning. This allows the user to replace the lobe portions 162 with different ones having varying slopes between the lobes 20 and cavities 22 for adjusting the piston throw length, timing, and torque per piston. Removable engagement may be accomplished by means of removable fasteners, snap fit means, or other means suitable for the intended purpose. FIG. 34 depicts a bottom view of the engine body 145 assembly of FIG. 31 engaged to the cam ring of FIG. 32 showing the preferred six piston configuration wherein each piston 12 has one or more power strokes per revolution of the cam ring 14. In this current six piston configuration, the resulting combination is twenty four power strokes per single revolution of the cam 14.

Figure 35:
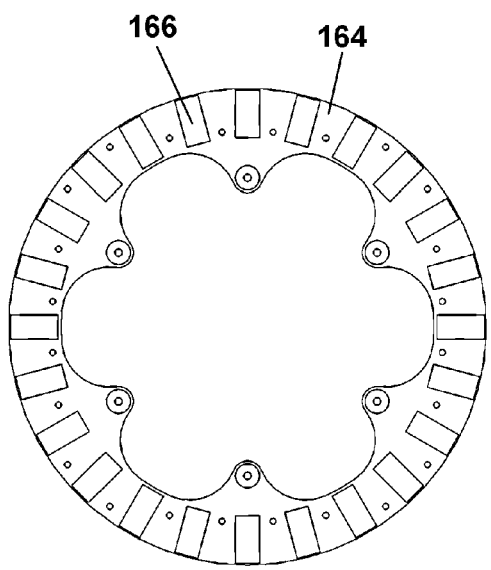
FIG. 35 depicts a top view of a rotor assembly employing an array of permeant magnets.

FIG. 35 depicts a top view of a rotor assembly 164 employing an array of a plurality of permanent magnets 166. In use the rotor assembly 164 engages the cam ring 14 by means of removable fasteners, screws, bolts, snap fit means, or the means suitable for the intended purpose. The rotor plate 164 may be a single cast or machined part with, or is affixed to, the cam ring 14 by fasteners or other means suitable.

Figure 36:
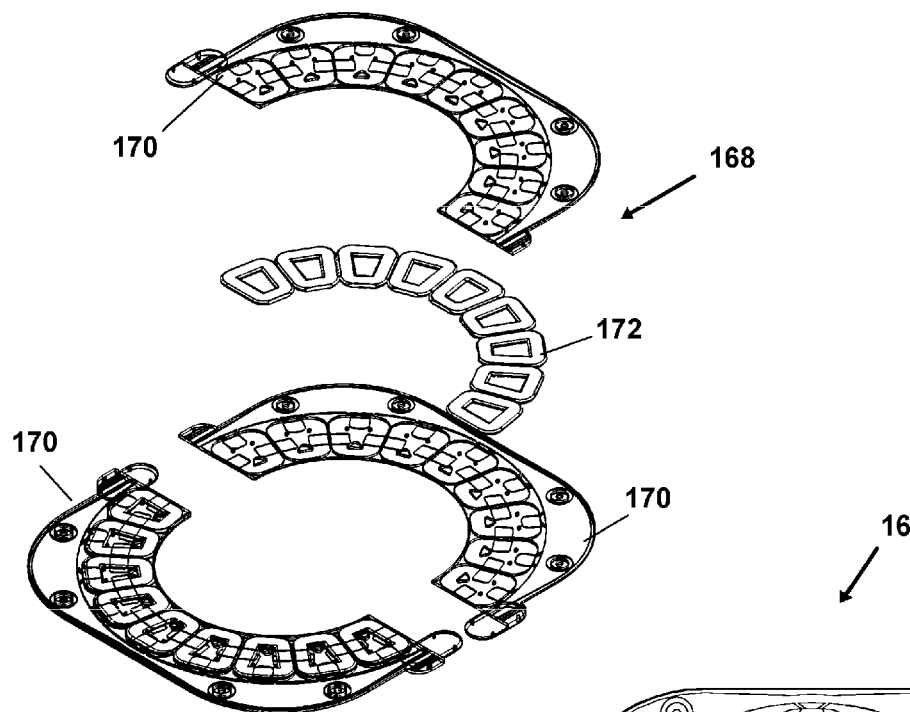
FIG. 36 shows a exploded perspective view of a preferred stator assembly which be dissembled into individual parts for easy removal or replacement.

FIG. 36 shows a exploded perspective view of a preferred stator assembly 168 which be dissembled into individual parts for easy removal or replacement. The assembly 168 includes stator housing portions 170 and one or a plurality of stator coils 172. Those skilled in the art will envision that the inclusion of output wire leads communicating with the coils 172 will be necessary to communicate the electricity in the coils for practical use elsewhere, and is anticipated. Further, those skilled may envision various modifications to the coil wire material, gauge, number of windings, and number of coils as needed to achieve a desired wattage output given the torque and RPM's produced by the engine. As such these features may vary widely and will be determined by the designer, while any particular configuration should not be considered limiting.

Figure 37:
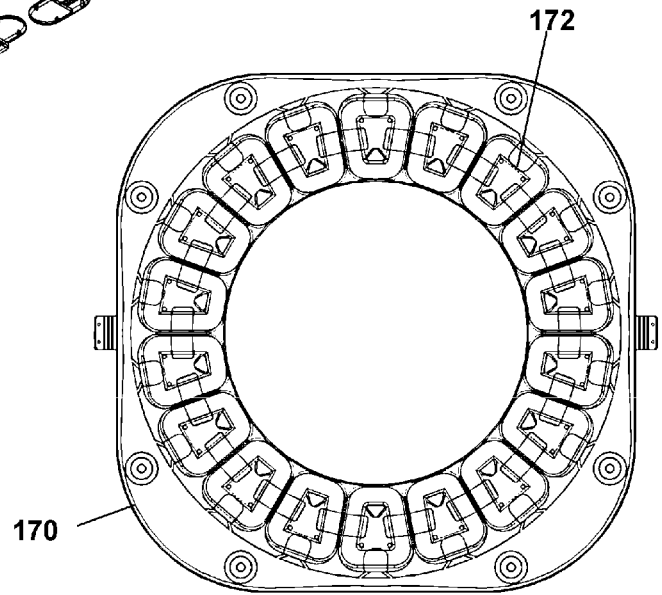
FIG. 37 shows a top view of the assembled stator assembly of FIG. 36.

The housing 170 is preferably disassembleable into a plurality of parts as shown for ease of removal of the stator assembly 168 from the engine 10G or for replacement of coils 172 as needed. The parts of the housing 170 may engage together via means of snap fasteners, or other fastener means generally not requiring tools, such as butterfly bolts. FIG. 37 shows a top view of the assembled stator assembly 168 of FIG. 36.

Figure 38:
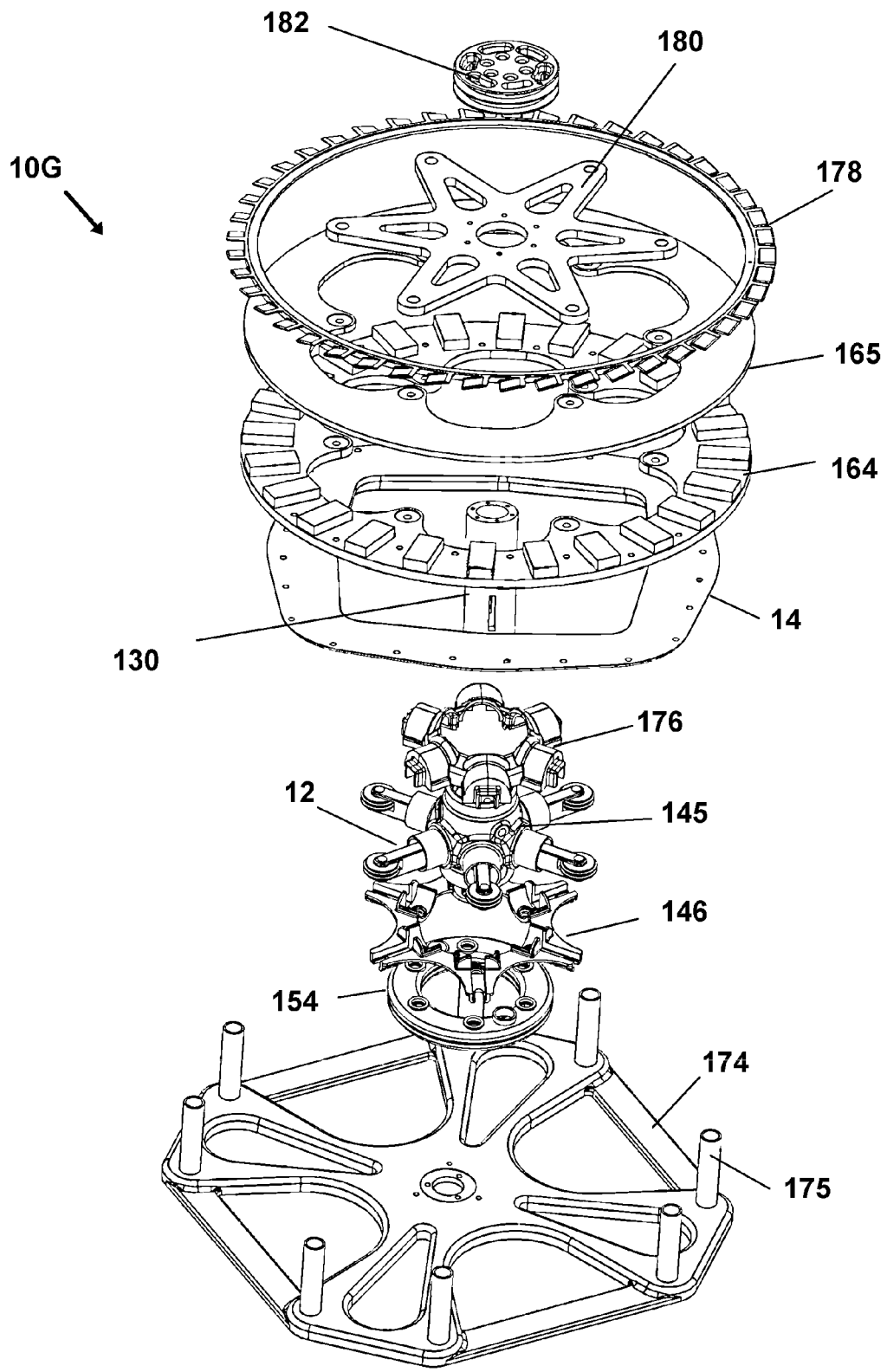
FIG. 38 shows a exploded perspective view of another preferred mode of the device configured for employment with the rotor and stator assemblies of FIGS. 36 and 37 respectively.

FIG. 38 shows a exploded perspective view of the six piston uniflow mode of the device 10G which is especially configured for employment with the rotor 164 and stator 168 assemblies of FIGS. 36 and 37 respectively. This mode of the device 10G is configured in a 'stacking' arrangement to allow an unskilled user to easily and quickly remove parts for servicing or replacement. As shown, the stacking order from bottom to top referring to the orientation in the figure, however without implying limitations thereon, generally comprises: a base mounting plate 174, exhaust manifold 154, retainer ring 146, body 145 with piston assemblies 13, an optional body insulation component 176, rotating valve 130, cam ring 14, rotor 164, top rotor plate 165, cooling ring with fins 178, rotating connector 180, and the timing component 182. The timing component 182 engages to the top of the valve 130 via the rotating connector 180 and provides a means for adjusting the valve timing by adjusting the position of the valve 130 relative the cam ring lobes.

Advantageously, the timing component 182 is engaged on the top of the 'stacked' arrangement of components such that the user does not have to remove any other parts in order to make the desired adjustments. A final "locking" or engagement of the Stacked" components together in the body assembly, may be accomplished through the use of 3 or more butterfly bolts, beneath the mounting plate, at the bottom of the engine body's assembly and engaged into the bottom of the engine body itself. These three butterfly bolts (not shown but easily discerned for engagement by on skilled in the art) eliminate the need for tools which is a significant advantage in a third-world deployment. The bolts can be loosened and removed by hand.

In addition, it is noted that the timing component 182 can also be configured as a drive system means by employing v-belt pulleys, gear belt features, chain sprocket teeth, drive shaft, or gear teeth for transmission of power from the engine to another device. In short, this component 182 provides significant plurality of valuable features including engine timing adjustment, determining the engines rotational direction, and a power take off provision by an easy geometry change using an immediately accessible location, all in a single part.

To create the required geometry change in the relationship between the valve openings and the cam lobes which is required to reverse the rotation of the engine's direction, as well as to convert the engine's function from an engine, to a pump, the valve to cam component must provide the ability to be rotated a total of the number of degrees that exists between center to center, between two of the adjacent valve intake openings. This relationship is consistent regardless of the number of intake openings provided in any valve/cam assembly.

Figure 38A:
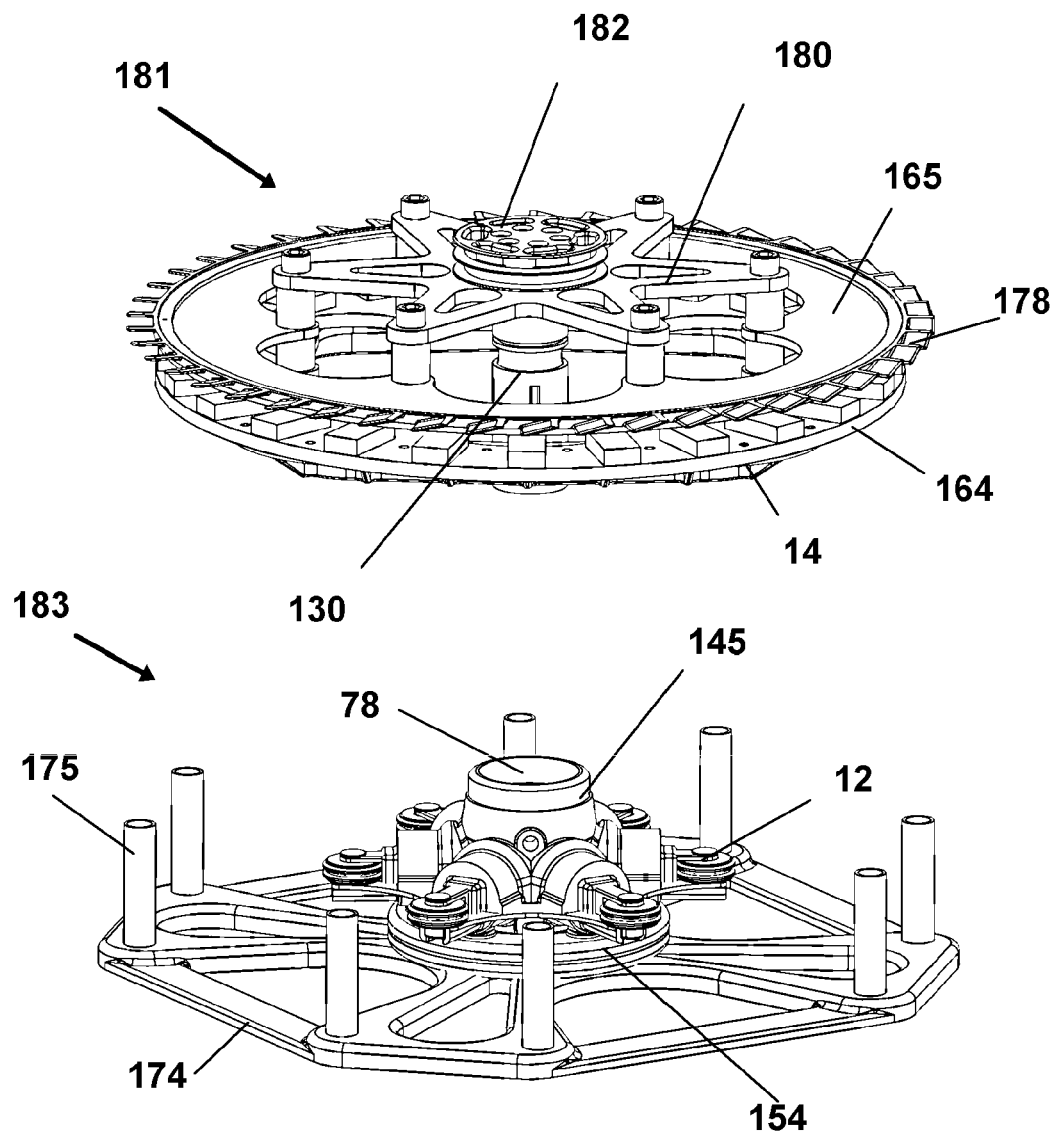
FIG. 38a shows a partial assembled view of the invention, showing the device assembled into two sub assemblies, namely the rotor assembly and the engine body assembly.

It is noted that the stacking arrangement of the various components of the engine, engage to form at least two sub assemblies 181, 183, shown in FIG. 38a. In the figure, there is shown a partial assembled view of the invention, showing the device 10G assembled into two sub assemblies, namely the rotor assembly 181 and the engine body assembly 183. The separate sub assemblies 181, 183 can be easily engaged together by hand, and without the use of fasteners, to provide a fully assembled engine driven by a choice of steam, compressed air, vacuum or pressurized gas, or which, with a simple rotational adjustment of an easily accessible timing component 182 can be used as an effective compressed air pump or a vacuum pump.

In order to assemble the two assemblies 181, 183 for the engine 10G to operate, the rotor assembly's 181 central valve 130 must be aligned and slipped down into the body's 145 valve cavity 78. Tapered bearing seats and a mating race in the engine body 145 may be employed to interface between the valve 130 and cavity 78.

To complete assembly each of the pistons rod followers 34, incorporating either a wheel fit with lubricated and sealed ball bearings or simply special sealed ball bearings, must be aligned to fit the followers 34 within the rotating cam rings follower track 18.

Figure 39:
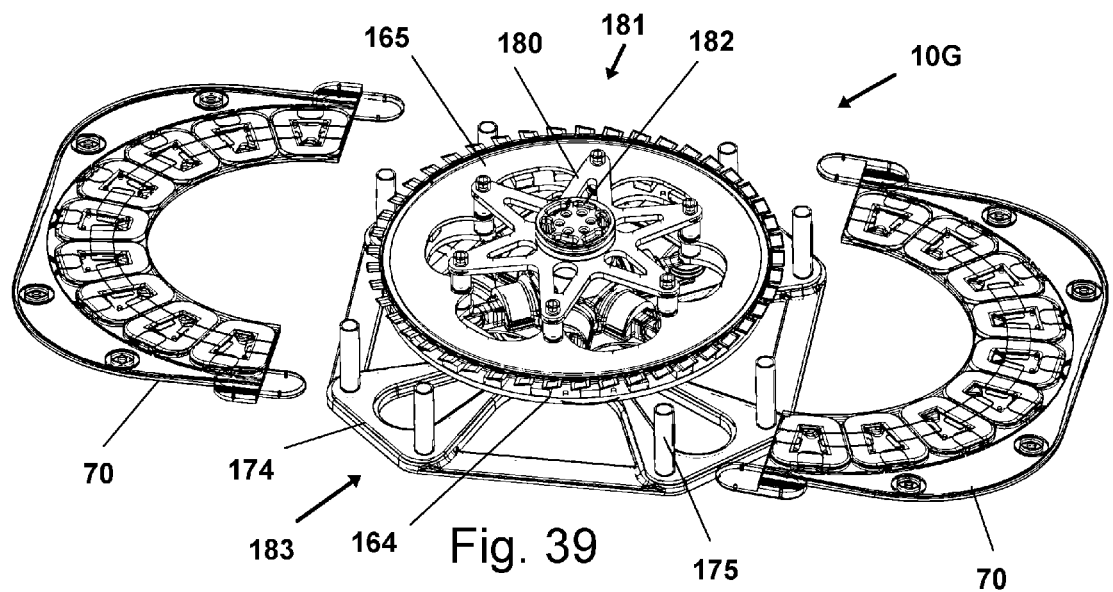
FIG. 39 shows an assembled perspective view of the device of FIG. 38, also depicting the stator assembly prior to an engagement with the device.

FIG. 39 shows an fully assembled perspective view of the device 10G of FIGS. 38 and 38a, also depicting the stator assembly 168 disassembled in to individual parts prior to an engagement with the device 10G, thus facilitating removal of the stator assembly 168 without removal of other engine parts.

Figure 40:
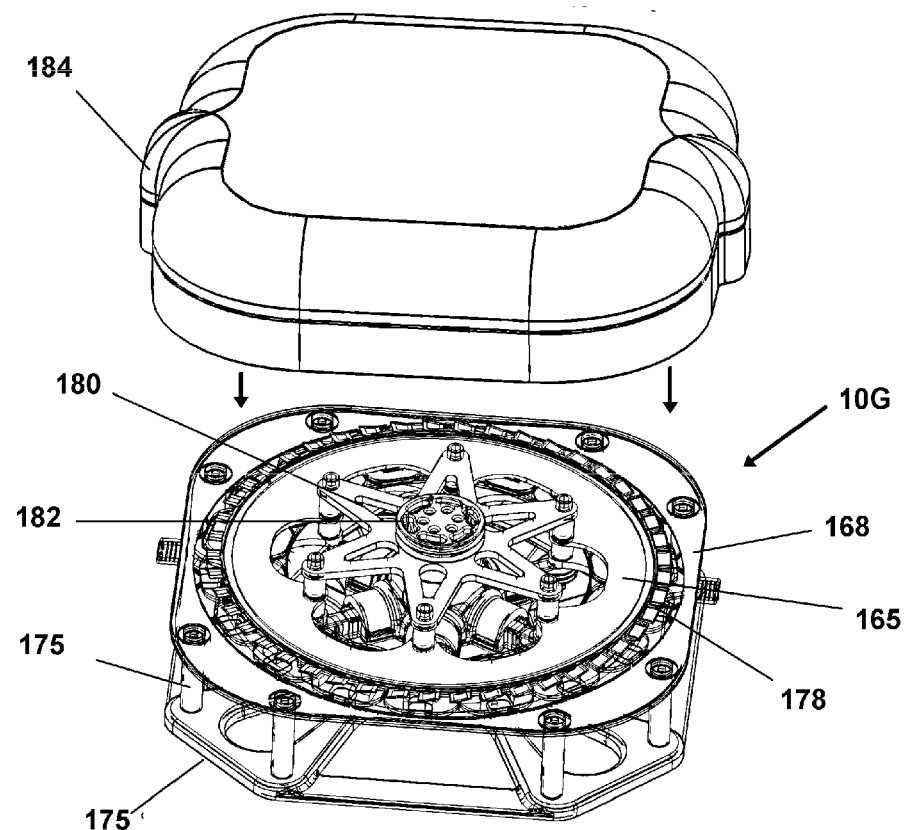
FIG. 40 depicts a final assembled view of the mode of the device of FIG. 39, also showing an engageable protective cover.

FIG. 40 depicts a final assembled view of the mode of the device 10G of FIG. 39, showing the stator assembly 168 engaged to standoffs 175 extending from the base mounting plate 175 such that the coils 172 are positioned within the magnetic flux area in the space between the rotor 164 and top rotor plate 165. The top rotor plate 165 is preferably a ferro-magnetic material as the positioning of the plate 165 adjacent the coils 172 and above the magnets 166 of the rotor 164 provide a means for capturing the flux emanating from the magnets within the space between the rotor 164 and top plate 165. This flux capture has been shown to increase the flux communicating through the coils 172 as opposed to designs not employing a top rotor plate 165. Further, other modes of the engine are envisioned wherein the bottom surface of the top plate 165 include an additional array of magnets thus further increase the magnetic flux through the coils 172 due to both the rotor 165 magnets 166 and inclusion of top plate 165 magnets. Also shown is an optional insulated housing cover.

Figure 41:
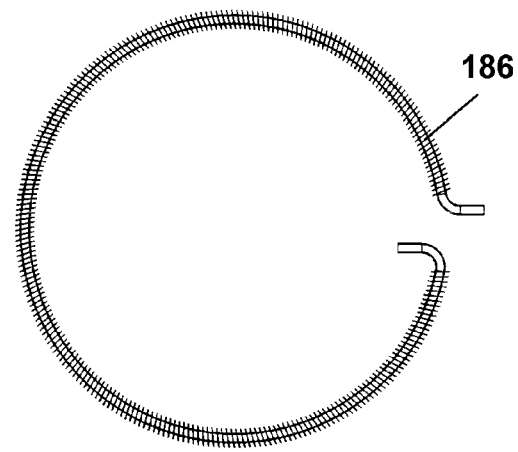
FIG. 41 shows a view of an optional condenser component for converting steam exhaust back into water.

FIG. 41 shows a top view of an optional condenser component 186 for converting steam exhaust exiting the exhaust manifold 154 back into water. As such, when the exhaust passes into the manifold 154, it is then communicated to the condenser 186 for condensation and re-use.

Figure 42:
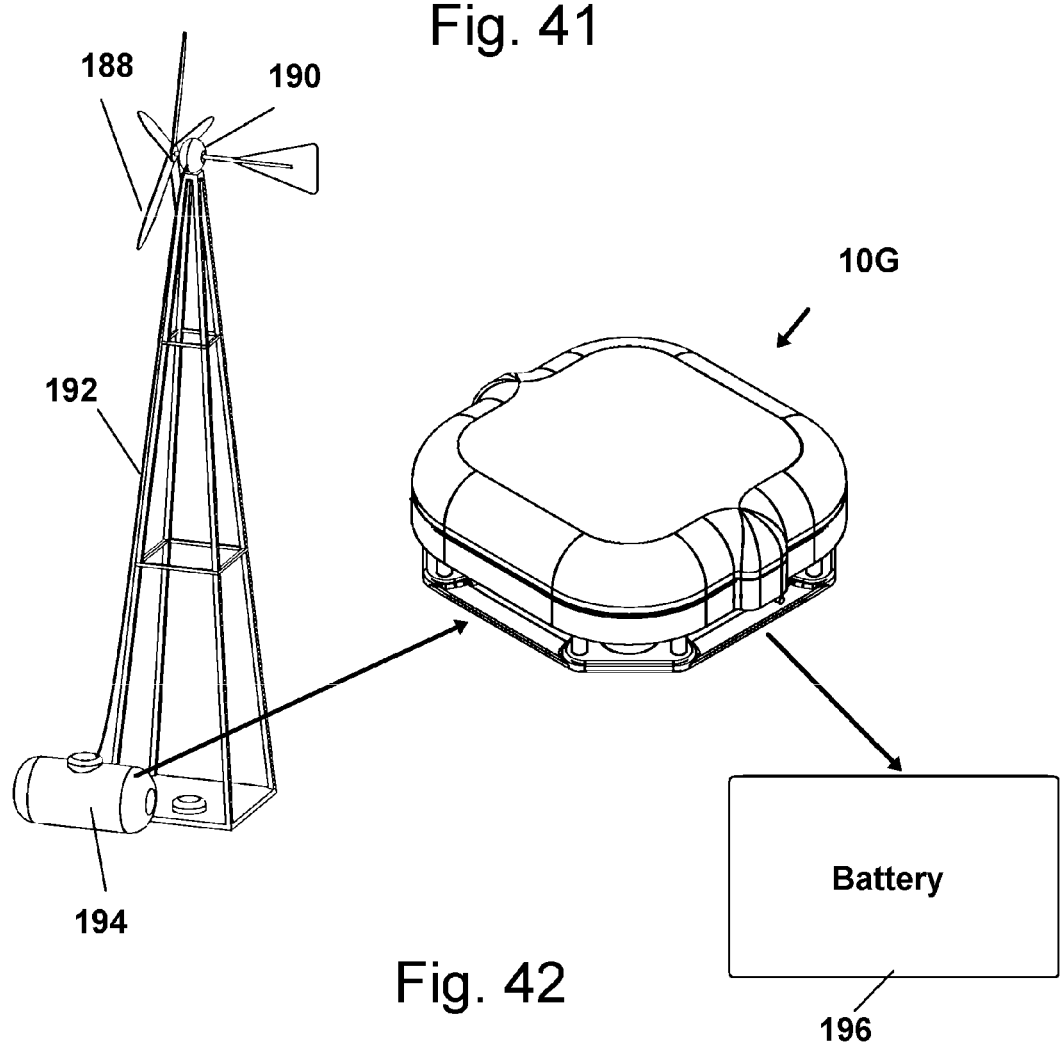
FIG. 42 shows a schematic representation of a preferred as used mode of the device employing a wind powered mechanical pump to communicate pressurized air into a storage reservoir for use as a working fluid with the device. The electricity produced can then be stored in batteries.

FIG. 42 shows a schematic representation of a preferred as-used mode of the device 10G employing a wind powered 188 mechanical pump 190 to communicate 192, via hose or the like, pressurized air into a storage reservoir 194 for use as a working fluid for powering the device 10G. The electricity produced can then be stored in batteries 196 for later use. This configuration provides a substantial improvement to conventional wind powered electricity generation means, particularly the wind turbine, which has many drawbacks. First, the turbine is located at the top of the tower making servicing and repair extremely dangerous, expensive, and requires highly skilled technicians due to the conventionally complex turbine systems. Further, the electrical cables communicating with the turbines are typically extremely bulky, expensive, and difficult to handle. The device 10G and preferred as used mode shown, solves these problems by means of a mechanical pump which can be serviced by relatively low skilled technician, and the communication means 192 can be provided by a sealed conduit for communicating pressurized air which can be provided by a single conduit communicating low pressure air from a pump such on a windmill or water wheel or livestock driven wheel or the like.

Figure 43:
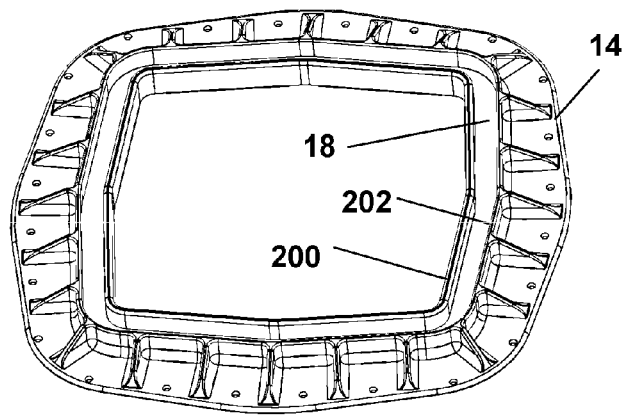
FIG. 43 shows another preferred mode of the rotary cam with the cam follower track disposed between an inner sidewall and an outer sidewall for engaging the cam follower of the piston in a restricted engagement to drive a pumping action of the pistons during a rotation of the cam, thereby configuring the engine as a pump to create compressed air, or to be used as an effective vacuum pump.

FIG. 43 shows another preferred mode of the rotary cam 14 with the cam follower track 18 disposed between an inner sidewall 200 and an outer sidewall 202 providing a restricted track 18 for engaging the cam follower 34, in which rotation of the cam 14 will drive radial and inward and outward translation of the pistons 12. Thus, in this mode, the cam 14 may be driven by any number of natural or mechanical rotational forces such as a wind driven propeller or rotor, a stream driven "paddle wheel", or rotational engine or motor, to provide every effective multi cylinder radial cam vacuum pump or air compressor. The effective and flexible nature of the cam designs means that the device can be used, with a small driving force, as an air pressure pump or a vacuum pump to create a simple-to-transfer energy obtained from a natural source such as wind or flowing water for storage in a container such as an air tank.

Thus it is of particular advantage that with the same device, simply by replacing the cam 14 to one of the preferred modes shown previously can convert the device into an engine to provide power to run any choice of devices requiring rotational forces, or, can provide electrical energy through its integral, built in rotor and stator configuration.

Figure 44:
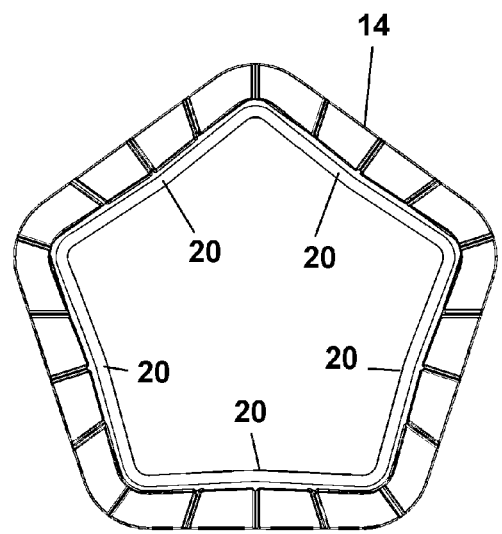
FIG. 44 shows another mode of the rotary cam providing a five compression lobe cam.

FIG. 44 shows another mode of the rotary cam 14 providing a five compression lobe cam 14. By replacing the valve/cam assembly from a 3 lobed cam, to a 5 lobed cam, the number of power strokes or compression or vacuum strokes per single revolution of the system changes from 18 strokes per single revolution to 30 strokes per single revolution. This provides a wide range of power and flexibility conservatively provided from the same body/cylinder/piston assembly and involves significantly decreased cost.

Figure 45:
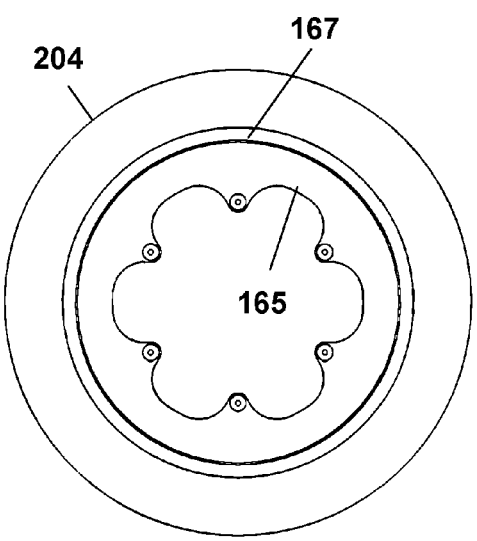
FIG. 45 show another preferred mode of the invention wherein the a drive wheel is engaged to the outer perimeter of the top rotor plate.
Figure 46:
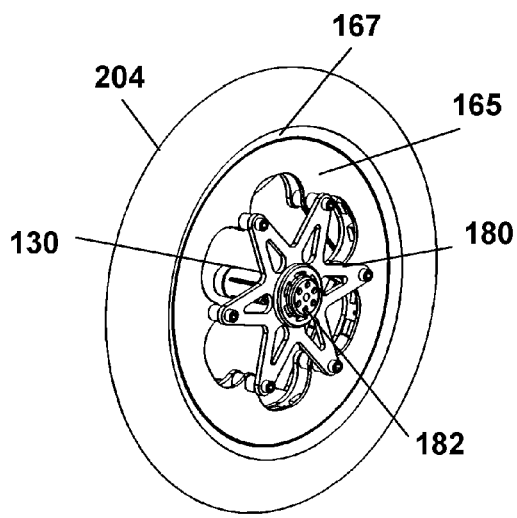
FIG. 46 shows a valve/cam assembly employing the drive wheel incorporated into its outer perimeter.

FIG. 45 and FIG. 46 show another preferred mode of the invention wherein the a drive wheel 204 engaged to the outer perimeter of a wheel hub 167 for engagement to the top rotor plate 165. This feature further provides valuable power/energy consumption flexibility. If a vehicle is carrying a load it might use more than one engine to provide its propulsion. If that same vehicle has no load, it might use only one engine and less need for energy consumption.

A further advantage of this feature is that it eliminates the need of space to house an engine and transmission within the vehicle body. That space can be used in any number of imaginable ways including simply a smaller sized vehicle providing good service and transportation.

A further advantage of this feature is that in situations where the vehicle is designed for warehouse or factory use, the engine(s) can be air driven with no indoor fossil fuel emissions. It is common for factories and even warehouses to have built into their system an air compressor with a network of outlets throughout the building. Transportation carts can be built that have a choice from one to four engines (one in each wheel) per cart.

When being used to transport human cargo, one engine can economically be used. If transporting components of weight, two or more can be engaged to carry the load. The same cart becomes highly efficient and quickly and easily "refueled" for multiple uses. Each parking area for a cart would have a "quick connect" air outlet which would allow a "recharge" of the cart during its stay in that location. Although a battery recharge can take hours, air recharges are quick and take seconds to minutes at most. As most drives through a factory or warehouse usually involve only a few minutes at most, the storage tanks and volumes required to be stored for ideal use of a cart would be lower pressure and small. The fuel and emissions would be "clean air in, clean air out".

The Rotary Cam Radial Steam or fluid powered Engine 10 shown in the drawings and described in detail herein disclosed arrangements of elements of particular construction and configuration for illustrating preferred embodiments of structure and method of operation of the present application. It is to be understood, however, that elements of different construction and configuration and other arrangements thereof, other than those illustrated and described may be employed for providing a Rotary Cam Radial Steam Engine 10 in accordance with the spirit of this disclosure, and such changes, alternations and modifications as would occur to those skilled in the art are considered to be within the scope of this design as broadly defined in the appended claims Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed:

1. A rotary cam radial engine comprising:
    a body, said body having a plurality of locating cavities in a radial orientation therein, each said locating cavity having a first end of a respective cylinder from a plurality of coplanar cylinders, positioned therein;
    a piston in a respective reciprocating engagement, within each respective said cylinder;
    each said piston having a top surface at a first end facing toward said first end of said cylinder, and having a second end opposite said top surface facing an open end of said cylinder, and engaged with a first end of a rod;
    a retaining ring configured for a cooperative engagement with said body;
    said retaining ring having a plurality of radially extending retaining cavities formed therein;
    each respective said retaining cavity sized on a first end for a cooperative engagement with an exterior of a respective said cylinder, said retaining ring in said cooperative engagement positioning said retaining cavity in a removable engagement with each said cylinder, said removable engagement maintaining said cylinder, in a fixed position relative to said body;
    each respective said cylinder being individually removable from said engine without removal of other said cylinders by disengagement of said first end thereof from said locating cavity and said exterior thereof from said retaining cavity;
    each respective said retaining cavity configured on a second end, for reciprocation of a said rod therethrough;
    a cam ring in a circumferential positioning encircling said radially extending retaining cavities;
    said cam ring having an interior circumference defining a race;
    each said rod at a second end, configured for a rolling engagement with said race;
    a respective intake port rotationally positionable to a respective operative communication with a respective first end of each respective said cylinder, at an intake position;
    each respective said intake port at said intake position, providing a communication of a pressurized fluid stream to a respective first end of a respective said cylinder, said communication of pressurized fluid imparting a force to a respective said piston within said respective cylinder, said force imparting a translation of said piston in a power stroke, toward said race;

said rolling engagement of each respective said rod, sequentially communicating said force against said race, thereby imparting a rotation to said cam ring; and whereby, said rotation of said cam ring communicated in an operative engagement with a secondary component, provides power thereto for work thereby, said power proportional to a number of said power strokes, per each complete rotation of said cam ring.

2. The rotary cam radial engine of claim 1, additionally comprising:

each respective said retaining cavity configured on a respective said second end, sized for a sliding contact with at least two opposing side surfaces of a respective said rod therethrough; and said sliding contact providing means for maintaining said rod and said piston engaged thereto, in a continuous axial alignment throughout each translation of said rod, thereby providing means to reduce side force from said piston traverse to said axial alignment and against said cylinder.

3. The rotary cam radial engine of claim 2, wherein said respective intake port and a respective exhaust port in an operative communication with each respective said cylinder comprises:

a rotating valve cavity positioned centrally within said body; and rotation of said valve cavity sequentially positioning an intake opening in communication with said pressurized fluid stream, in a sequential communication with one of said intake ports, thereby sequentially communicating said pressurized fluid stream to each respective said cylinder, at least one time, per each said revolution within said cam ring during a complete circle therearound by said plurality of retaining cavities, whereby said respective pistons in each of said plurality of cylinders translate in said power stroke, toward said race upon each said communication of said pressurized fluid stream to a respective said cylinder.

4. The rotary cam radial engine of claim 3 additionally comprising:

said rotation of said valve cavity sequentially positioning said intake opening supplying said pressurized fluid stream, in a sequential communication with each one of said intake ports, being adjustable to communicate said pressurized fluid stream, a plurality of times per each said revolution around said cam ring in a complete circle by said plurality of retaining cavities;

whereby said respective pistons in each of said plurality of cylinders translate in multiple said power strokes, toward said race, during each said single revolution; and whereby an adjustment of said valve cavity to increase communication of said pressurized fluid stream to yield said multiple power strokes, provides means to increase power and torque of said rotary cam for employment for said work.

5. The rotary cam radial engine of claim 4 additionally comprising:

said cam ring including an array of a plurality of permanent magnets circumferentially positioned thereon; and said cam ring rotating adjacent a fixed stator assembly having windings positioned therein, whereby electricity is generated by said rotation of said cam ring.

6. The rotary cam radial engine of claim 5 additionally comprising said stator assembly being from a kit of a plurality of said stator assemblies each having different said winding thereon generating a different voltage said electricity, wherein a change of said stator assembly to one having said windings configured to produce a desired voltage of said electricity may be achieved by users through engagement of said stator assembly having said windings configured to yield the desired voltage of said electricity by the system.

7. The rotary cam radial engine of claim 3 additionally comprising:

a seal located within a recess in a circumferential side surface of said piston, said recess paralleling a circumferential path of a circumferential surface of said cylinder;

said seal formed of flexible material having an enlarged size extending from an engaged position, within said recess, to a position extending beyond said circumferential side surface of said piston; and said seal forming a compressed engagement against both said circumferential surface of said cylinder and said recess, during said translation of said piston within said cylinder, said compressed engagement providing enhanced sealing and means for prevention of a communication of said pressurized fluid supply between said circumferential side surface of said piston and said circumferential surface of said cylinder.

8. The rotary cam radial engine of claim 7 additionally comprising:

a fluid channel communicating between said top surface of said piston and said recess;

said fluid channel positioned for communicating a portion of said pressurized fluid stream communicated to said top surface, to a first side of said seal; and said portion of said pressurized fluid stream against said first side of said seal, imparting a bias of said seal toward said sidewall of said cylinder, said bias enhancing said compressed engagement against said sidewall of said cylinder thereby enhancing said sealing.

9. The rotary cam radial engine of claim 3 additionally comprising:

said cam ring including an array of a plurality of permanent magnets circumferentially positioned thereon; and said cam ring rotating adjacent a fixed stator assembly having windings positioned therein whereby electricity is generated by said rotation of said cam ring.

10. The rotary cam radial engine of claim 9 additionally comprising said stator assembly being from a kit of a plurality of said stator assemblies each having different said windings thereon generating a different voltage said electricity, wherein a change of said stator assembly to one having said windings configured to produce a desired voltage of said electricity may be achieved by users through engagement of said stator assembly having said windings configured to yield the desired voltage of said electricity by the system.

11. The rotary cam radial engine of claim 2 additionally comprising:

a seal located within a recess in a circumferential side surface of said piston, said recess paralleling a circumferential path of a circumferential surface of said cylinder;

said seal formed of flexible material having an enlarged size extending from an engaged position, within said recess, to a position extending beyond said circumferential side surface of said piston; and said seal forming a compressed engagement against both said circumferential surface of said cylinder and said recess, during said translation of said piston within said cylinder, said compressed engagement providing enhanced sealing and means for prevention of a communication of said pressurized fluid supply between said circumferential side surface of said piston and said circumferential surface of said cylinder.

12. The rotary cam radial engine of claim 1, wherein said respective intake port and a respective exhaust port in an operative communication with each respective said cylinder comprises:
   a rotating valve cavity positioned centrally within said body; and
   rotation of said valve cavity sequentially positioning an intake opening in communication with said pressurized fluid stream, in a sequential communication with one of said intake ports, thereby sequentially communicating said pressurized fluid stream to each respective said cylinder, at least one time, per each said revolution within said cam ring during a complete circle therearound by said plurality of retaining cavities, whereby said respective pistons in each of said plurality of cylinders translate in said power stroke, toward said race upon each said communication of said pressurized fluid stream to a respective said cylinder.

13. The rotary cam radial engine of claim 12 additionally comprising:
   said rotation of said valve cavity sequentially positioning said intake opening supplying said pressurized fluid stream, in a sequential communication with each one of said intake ports, being adjustable to communicate said pressurized fluid stream, a plurality of times per each said revolution around said cam ring in a complete circle by said plurality of retaining cavities;
   whereby said respective pistons in each of said plurality of cylinders translate in multiple said power strokes, toward said race, during each said single revolution; and
   whereby an adjustment of said valve cavity to increase communication of said pressurized fluid stream to yield said multiple power strokes, provides means to increase power and torque of said rotary cam for employment for said work.

14. The rotary cam radial engine of claim 13 additionally comprising:
   said cam ring including an array of a plurality of permanent magnets circumferentially positioned thereon; and
   said cam ring rotating adjacent a fixed stator assembly having windings positioned therein whereby electricity is generated by said rotation of said cam ring.

15. The rotary cam radial engine of claim 14 additionally comprising said stator assembly being from a kit of a plurality of said stator assemblies each having different said windings thereon generating a different voltage said electricity, wherein a change of said stator assembly to one having said windings configured to produce a desired voltage of said electricity may be achieved by users through engagement of said stator assembly having said windings configured to yield the desired voltage of said electricity by the system.

16. The rotary cam radial engine of claim 12 additionally comprising: a seal located within a recess in a circumferential surface of said piston, said recess paralleling a circumferential path of a circumferential surface of said cylinder;
   said seal formed of flexible material having an enlarged size extending from an engaged position, within said recess, to a position extending beyond said circumferential side surface of said piston; and
   said seal forming a compressed engagement against both said circumferential surface of said cylinder and said recess, during said translation of said piston within said cylinder, said compressed engagement providing enhanced sealing and means for prevention of a communication of said pressurized fluid supply between said circumferential side surface of said piston and said circumferential surface of said cylinder.

17. The rotary cam radial engine of claim 16 additionally comprising:
   a fluid channel communicating between said top surface of said piston and said recess;
   said fluid channel positioned for communicating a portion of said pressurized fluid stream communicated to said top surface, to a first side of said seal; and
   said portion of said pressurized fluid stream against said first side of said seal, imparting a bias of said seal toward said sidewall of said cylinder, said bias enhancing said compressed engagement against said sidewall of said cylinder thereby enhancing said sealing.

18. The rotary cam radial engine of claim 1 additionally comprising:
   a seal located within a recess in a circumferential side surface of said piston, said recess paralleling a circumferential path of a circumferential surface of said cylinder;
   said seal formed of flexible material having an enlarged size extending from an engaged position, within said recess, to a position extending beyond said circumferential side surface of said piston; and
   said seal forming a compressed engagement against both said circumferential surface of said cylinder and said recess, during said translation of said piston within said cylinder, said compressed engagement providing enhanced sealing and means for prevention of a communication of said pressurized fluid supply between said circumferential side surface of said piston and said circumferential surface of said cylinder.

19. The rotary cam radial engine of claim 1 additionally comprising:
   said a cam ring being from a kit, said kit having a plurality of said cam rings, each said cam ring in said plurality having a different configuration of said interior circumference thereby defining a different configuration of said race, each said race configuration adapted for operative engagement with a differing number of said cylinders; and
   said body being from a kit of a plurality of said bodies, each of said bodies in said kit having a differing number of said locating cavities in a radial orientation therein;
   whereby, said rotary cam radial engine is configurable by a user for more or less power from more or less said cylinders by assembly of said engine using a body from said kit having a number of locating cavities therein, to accommodate a chosen number of said cylinders, and a chosen said cam ring from said kit having said configuration of said interior surface defining a race configured for operative engagement with said chosen number of cylinders.

* * * * *